United States Patent [19]

Collender

[11] 4,089,597

[45] May 16, 1978

[54] STEREOSCOPIC MOTION PICTURE SCANNING REPRODUCTION METHOD AND APPARATUS

[76] Inventor: Robert Bruce Collender, 709 Patterson Ave., Glendale, Calif. 91203

[21] Appl. No.: 666,158

[22] Filed: Mar. 11, 1976

[51] Int. Cl.² ............................................. G03B 35/00
[52] U.S. Cl. ...................................... 352/53; 352/58; 352/40; 352/133
[58] Field of Search ..................... 352/53, 58, 40, 38, 352/43, 44, 57, 133; 350/129; 352/86; 350/130

[56] References Cited

U.S. PATENT DOCUMENTS

| | | | |
|---|---|---|---|
| 1,265,352 | 5/1918 | Merrill et al. | 352/53 |
| 1,963,438 | 6/1934 | Greensfelder | 352/58 |
| 2,002,090 | 5/1935 | Ives | 352/53 |
| 3,199,116 | 8/1965 | Ross | 352/58 |
| 3,201,797 | 8/1965 | Roth | 350/129 |
| 3,463,581 | 8/1969 | Clay | 352/58 |
| 3,482,913 | 12/1969 | Glenn | 352/58 |
| 3,743,394 | 7/1973 | Meszlenyi | 352/53 |
| 3,815,979 | 6/1974 | Collender | 352/53 |

Primary Examiner—Monroe H. Hayes

[57] ABSTRACT

My invention relates to photographing scenes with standard motion picture photographic equipment in which there is a relative motion between the scene and camera with the purpose of stereoscopic viewing of the motion picture or stationary reproduction without the need for viewing aids at the eyes. The system is compatible with scenes photographed without this relative motion, where with the reproduction is viewed in conventional two dimensions.

The surface of the processed film (or other appropriate media) is arrayed in a vertical plane and constrained to move horizontally around a segment of a circle of radius 2R. At the center of the film circle is a film motion compensator which can be a multi faceted mirror drum of radius R. The film is rapidly scanned about the center of this circle by a light source directed through the film and toward the center of the mirror drum. The optical film scanner contains projection optics on the inside of the film circle that rotates the bright central image at the mirror drum centerline by a fixed 90° and develops a horizontally scanning and circularly moving pseudo projection point to provide a suitably large and erect picture format on a semi-specular and circular viewing screen having both horizontal and vertical elements. The rotating pseudo projection point scans and repeats at a rate to exceed the flicker frequency of the eye. The horizontal elemental screen characteristics cause the projected rays to vertically diffuse. The vertical elemental screen characteristics cause the reflections of the sweeping central projection ray to remain parallel as it leaves the screen toward the observer's eyes. The vertical elements also cause the whole images projected by the pseudo projection point, to converge at the vertical pseudo slit position. The angular velocity of the pseudo slit is equal to the angular velocity of the scanning pseudo projection point. An alternate semi-specular curved screen is constructed with horizontal ridges over the whole screen width to cause vertical diffusion of the projected light and to develop the circularly moving pseudo vertical viewing slit. If the film and motion compensator remain stationary, the stereoscopically reproduced scene is also stationary. If the film and motion compensator are in locked motion as the film is scanned by the optic scanner, the picture will move and stereoscopic motion pictures can be observed without any form of visual aid at the observer's eyes.

4 Claims, 41 Drawing Figures

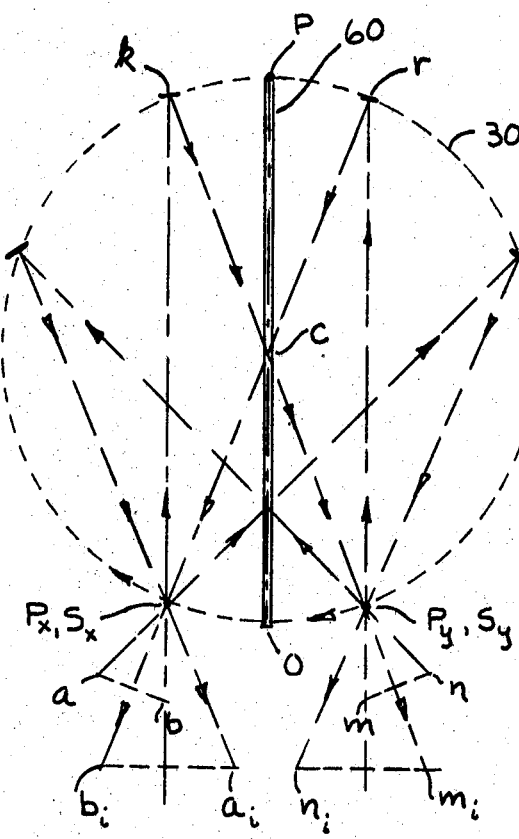
FIG·6

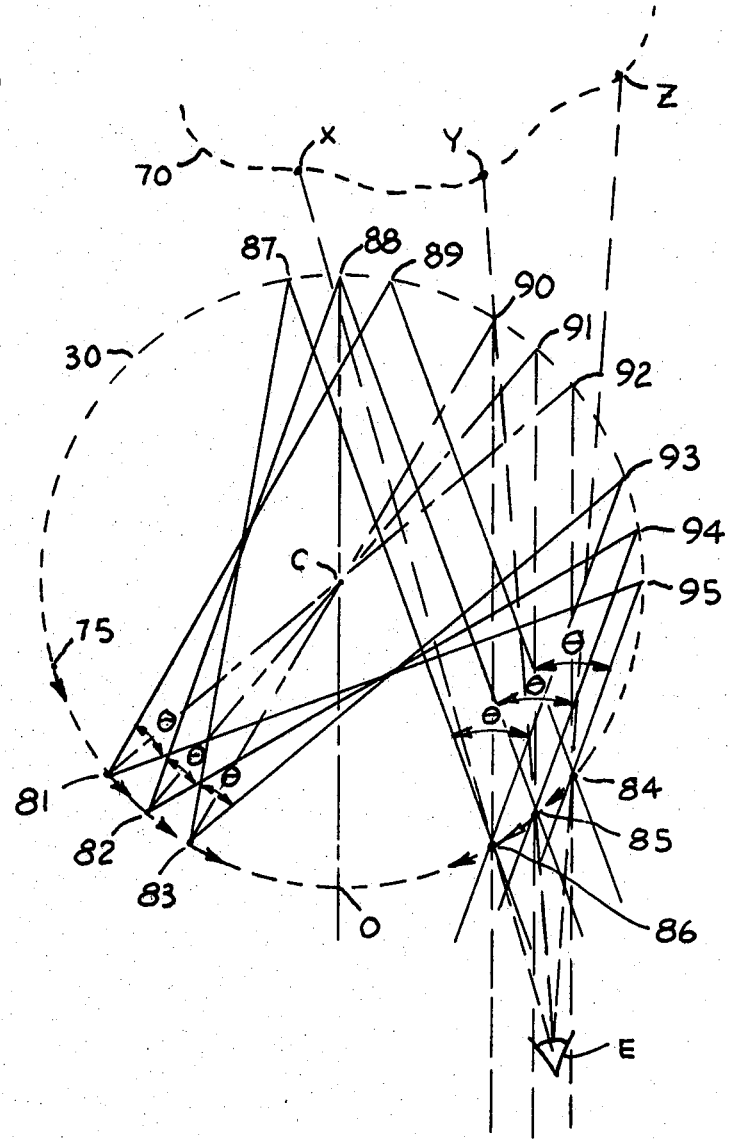

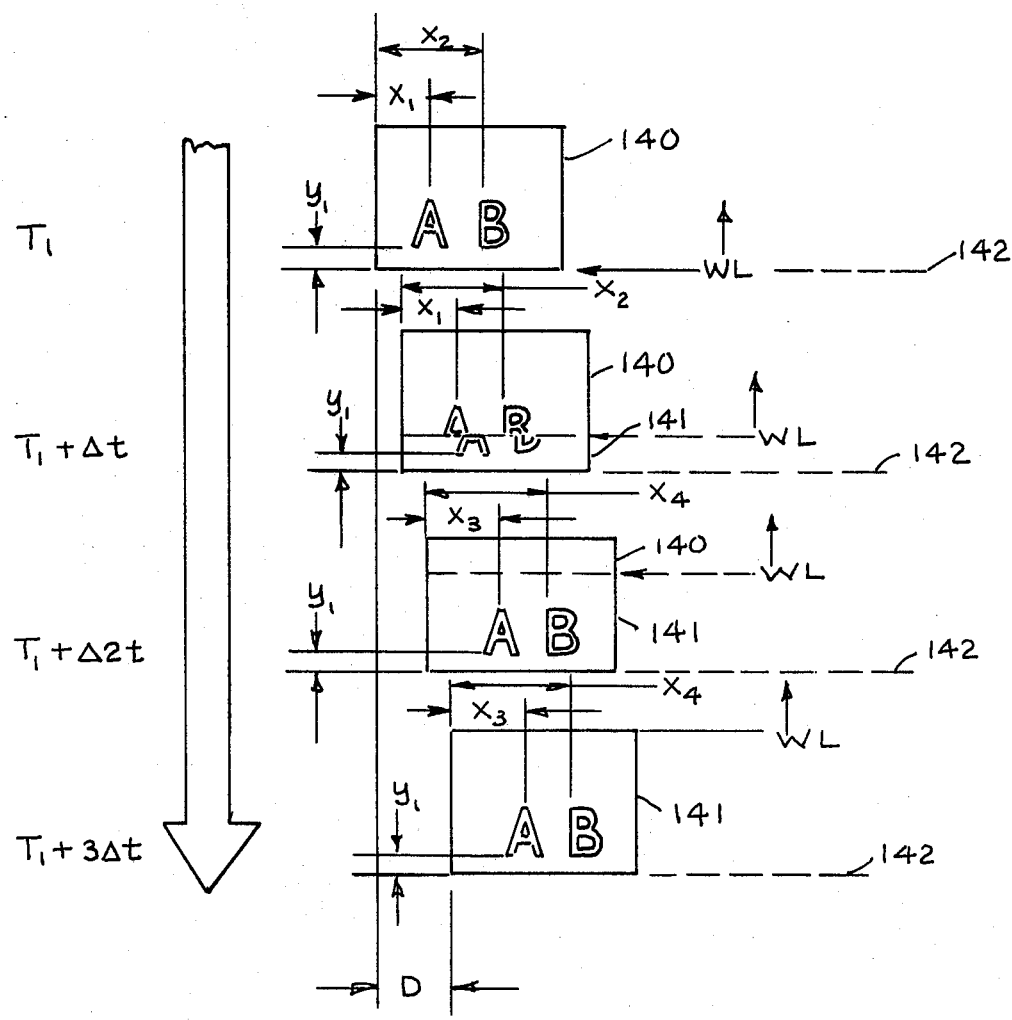

FIG·9A
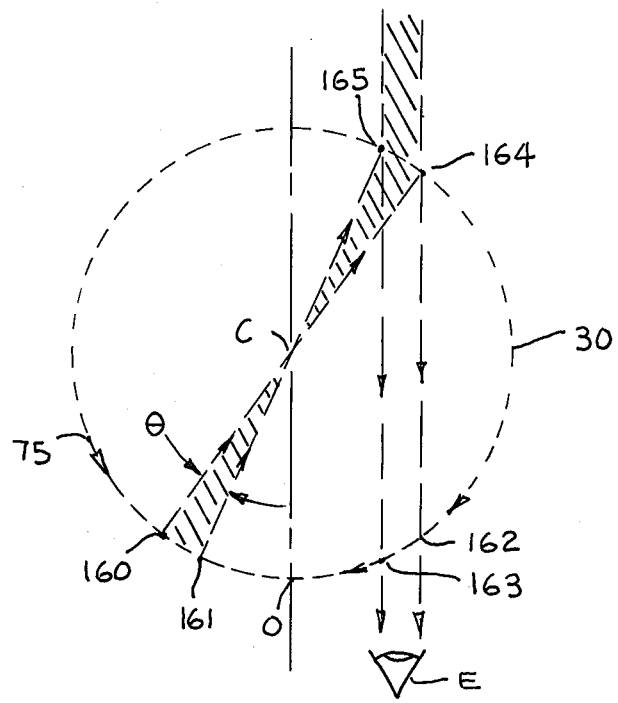
FIG·9B
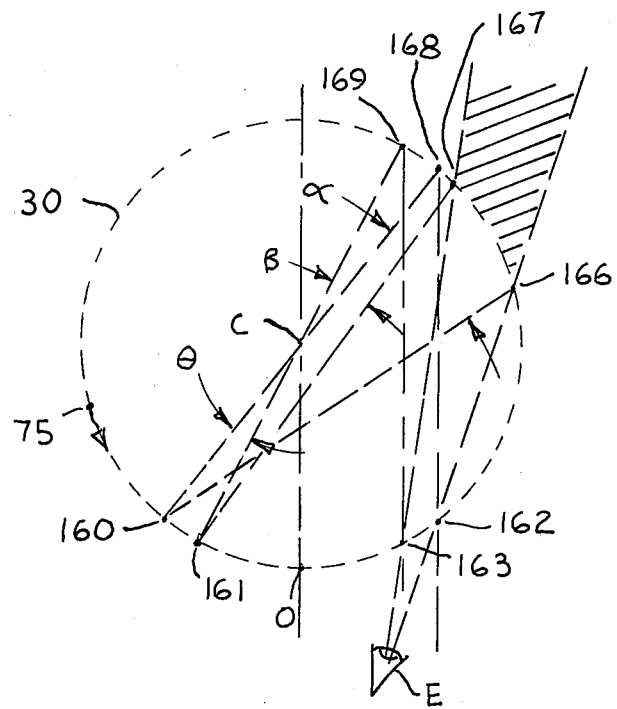

FIG·10B
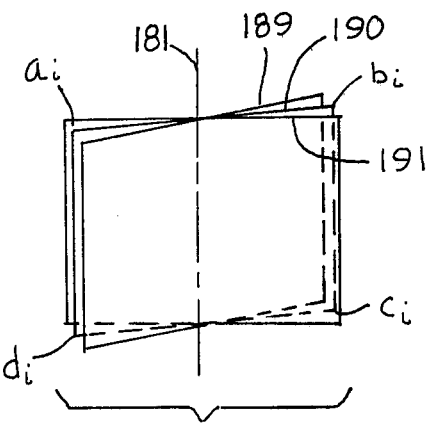
FIG·10A
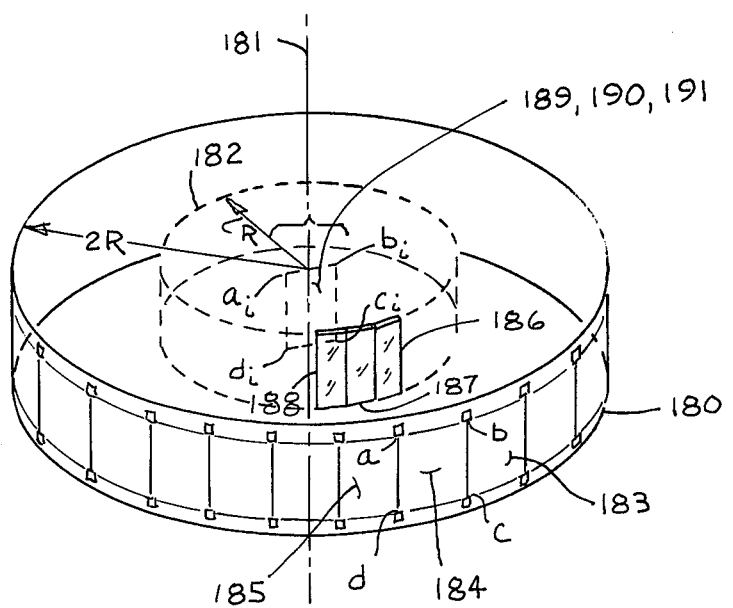

FIG·11A
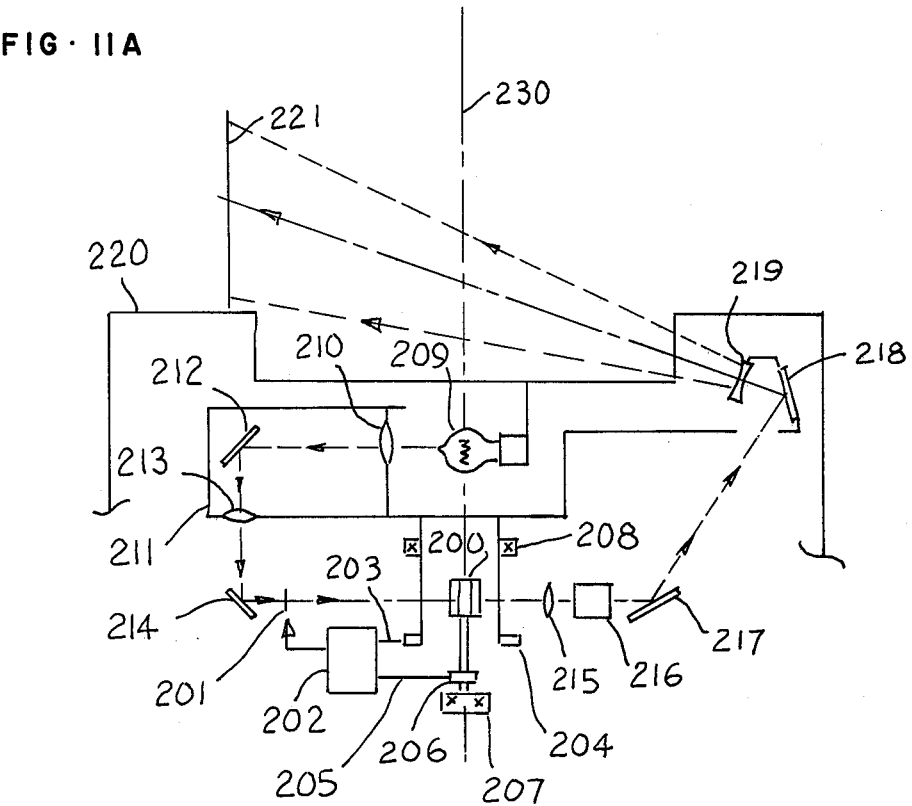
FIG·11B
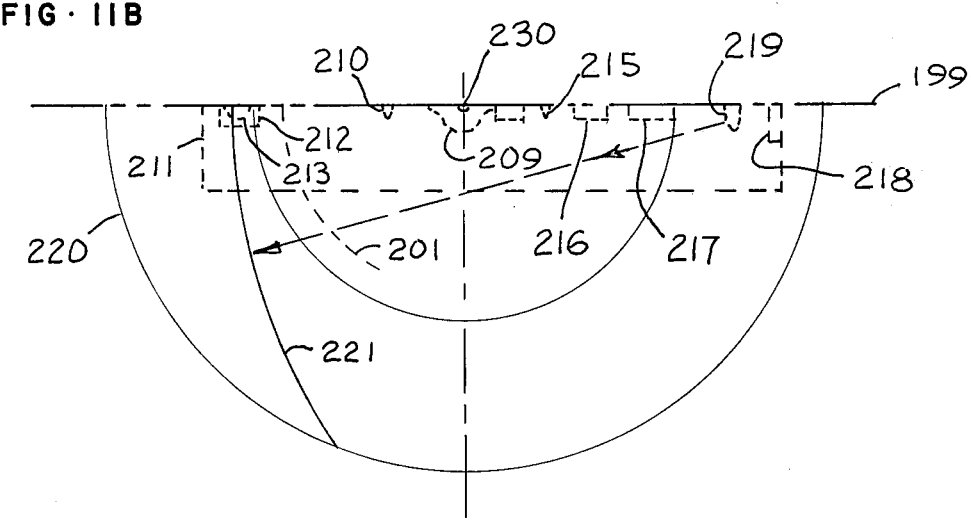

FIG·12A
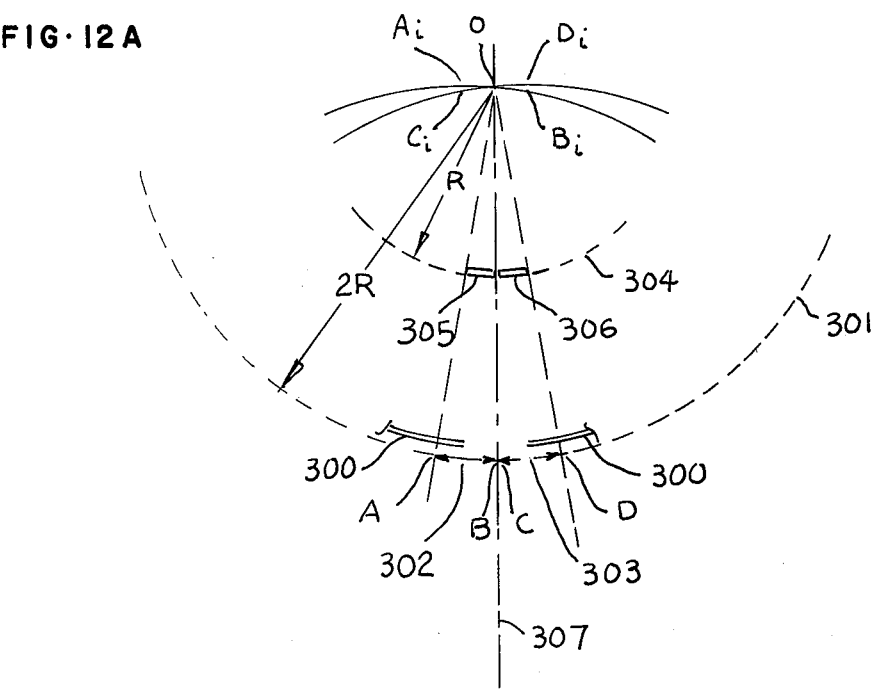
FIG·12B
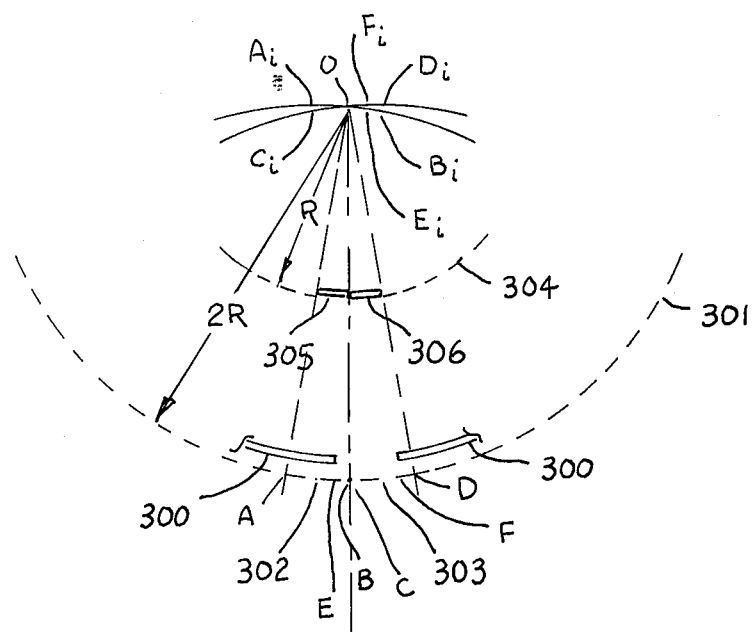

FIG·12C
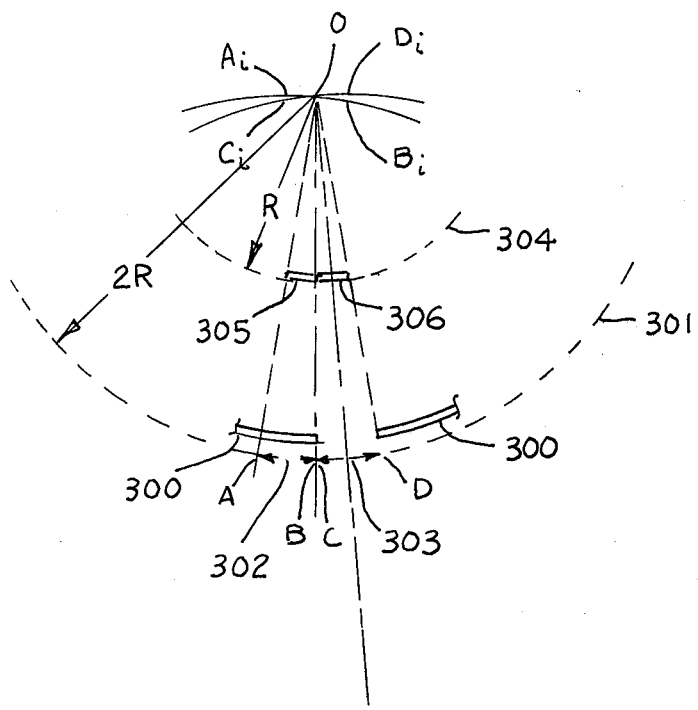
FIG·13
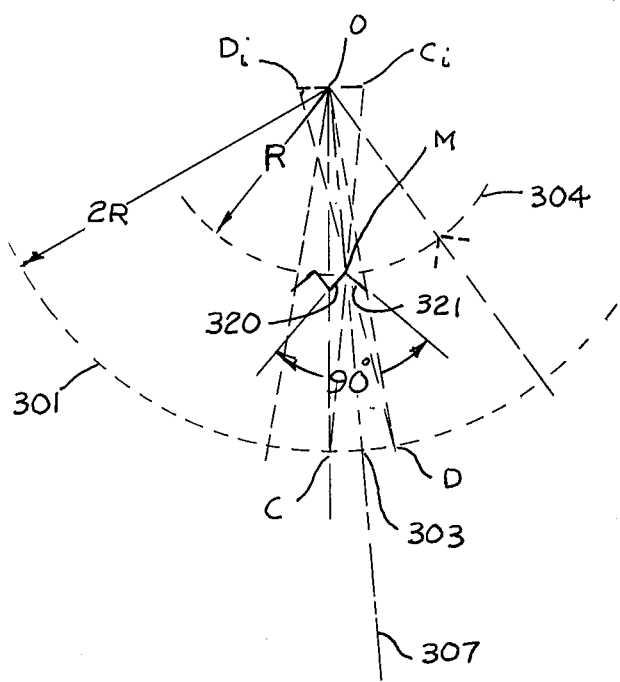

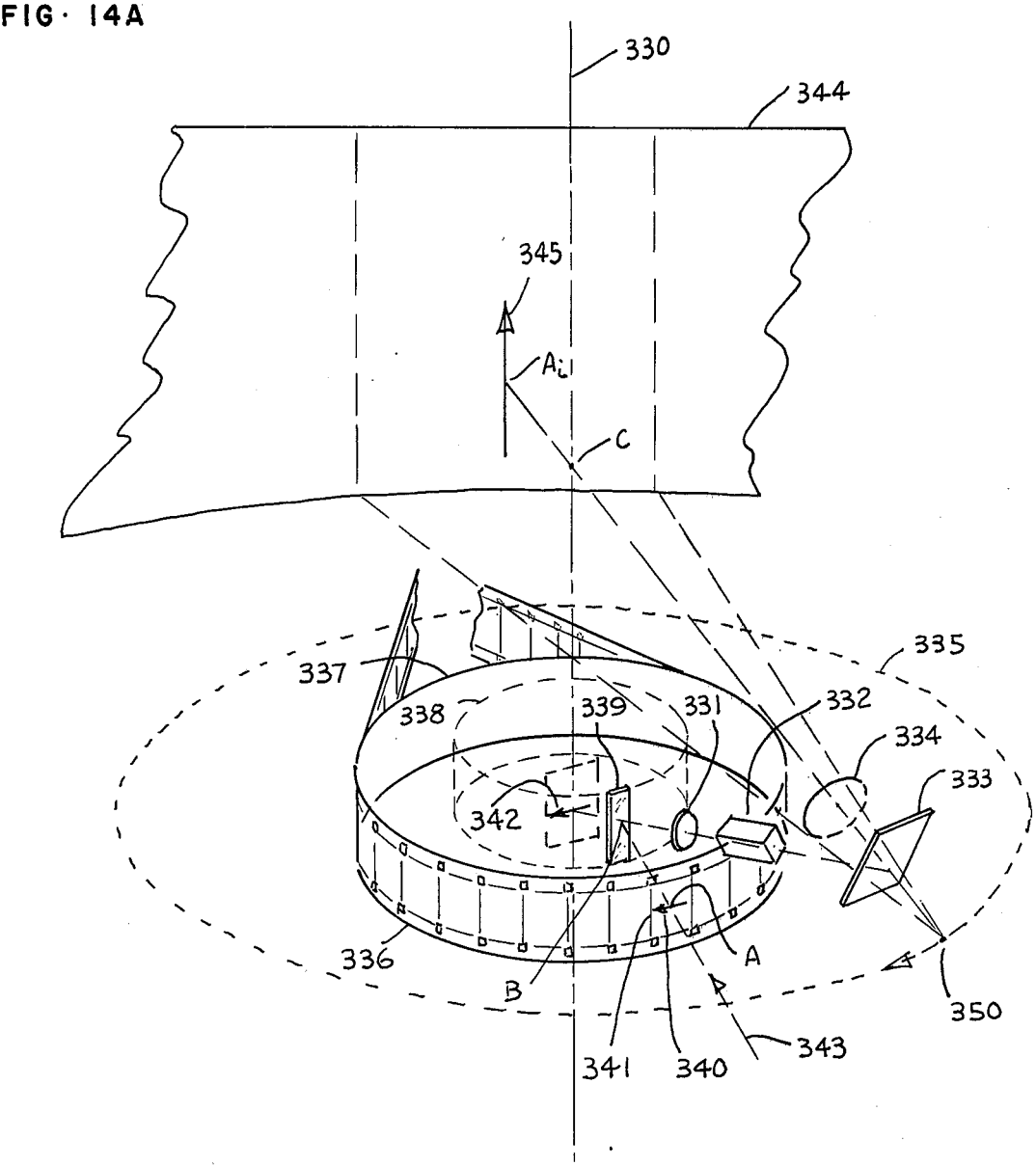
FIG·14A

FIG·14B
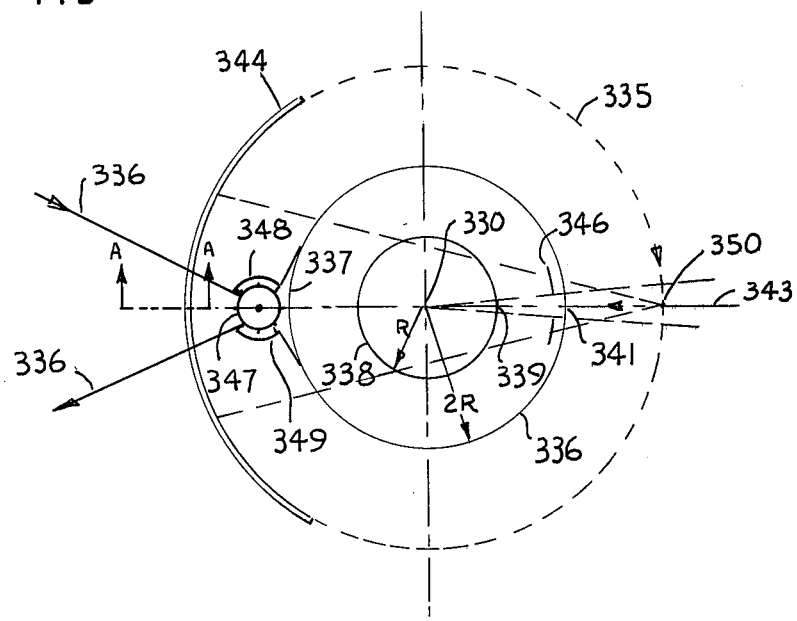
FIG·14C
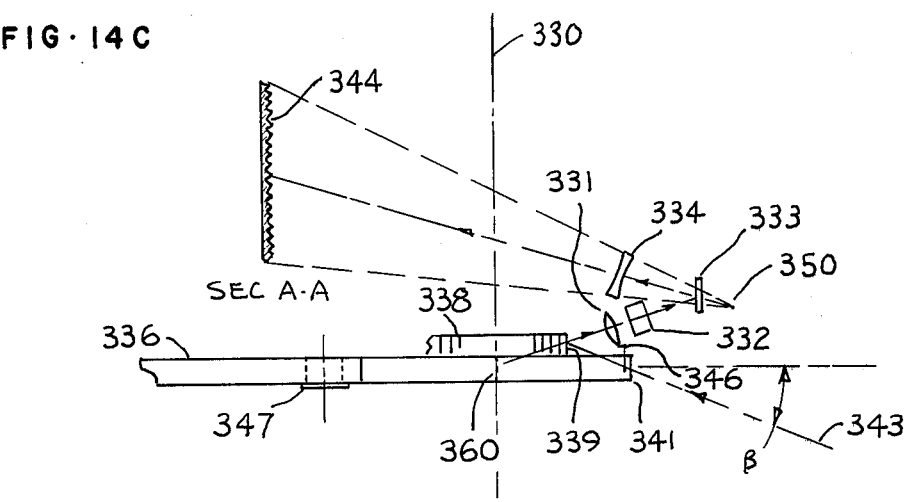

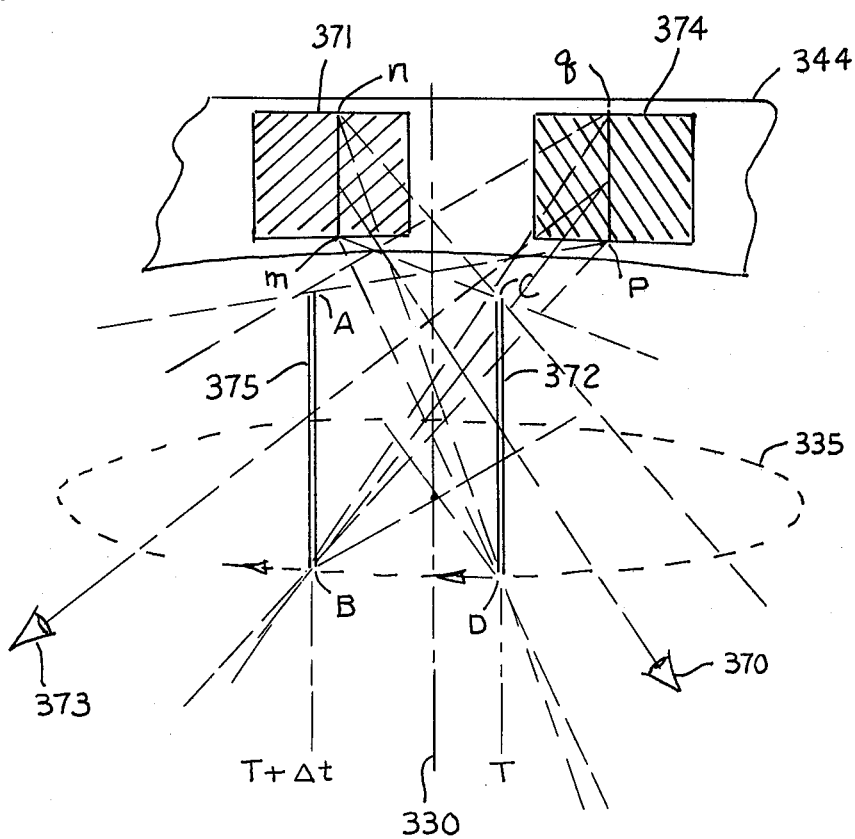

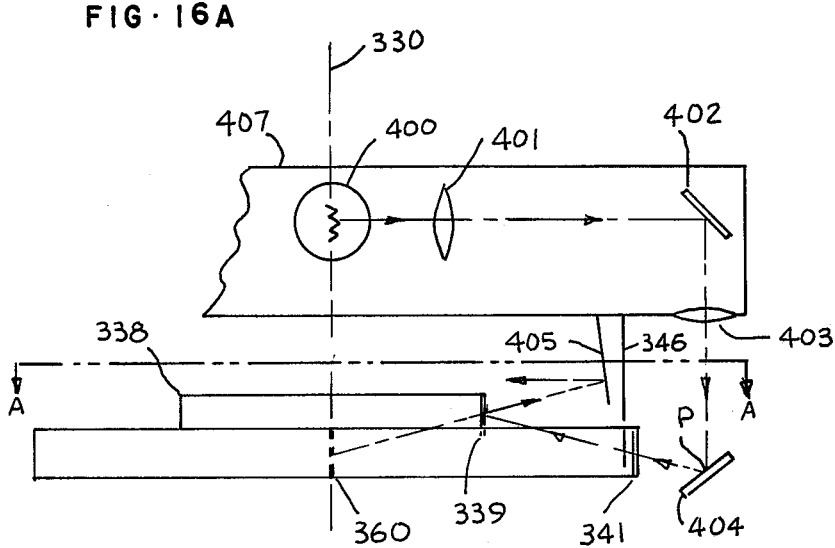
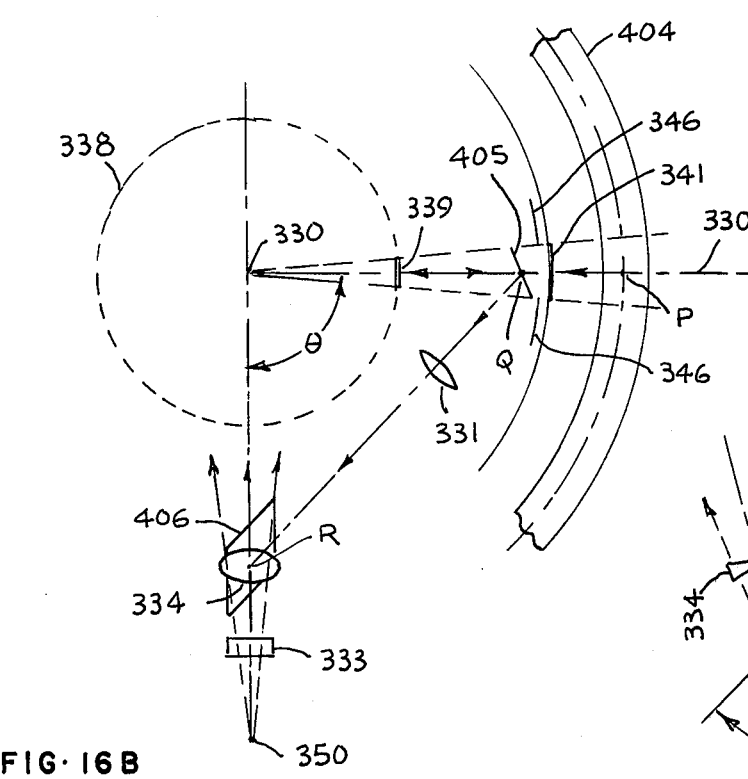
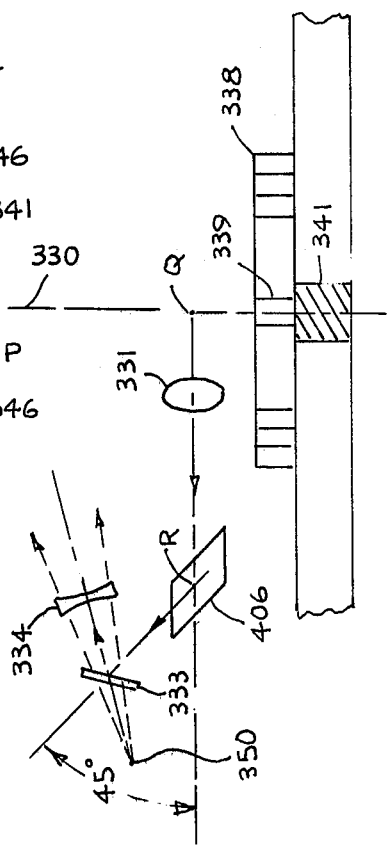
FIG·16A
FIG·16B
FIG·16C

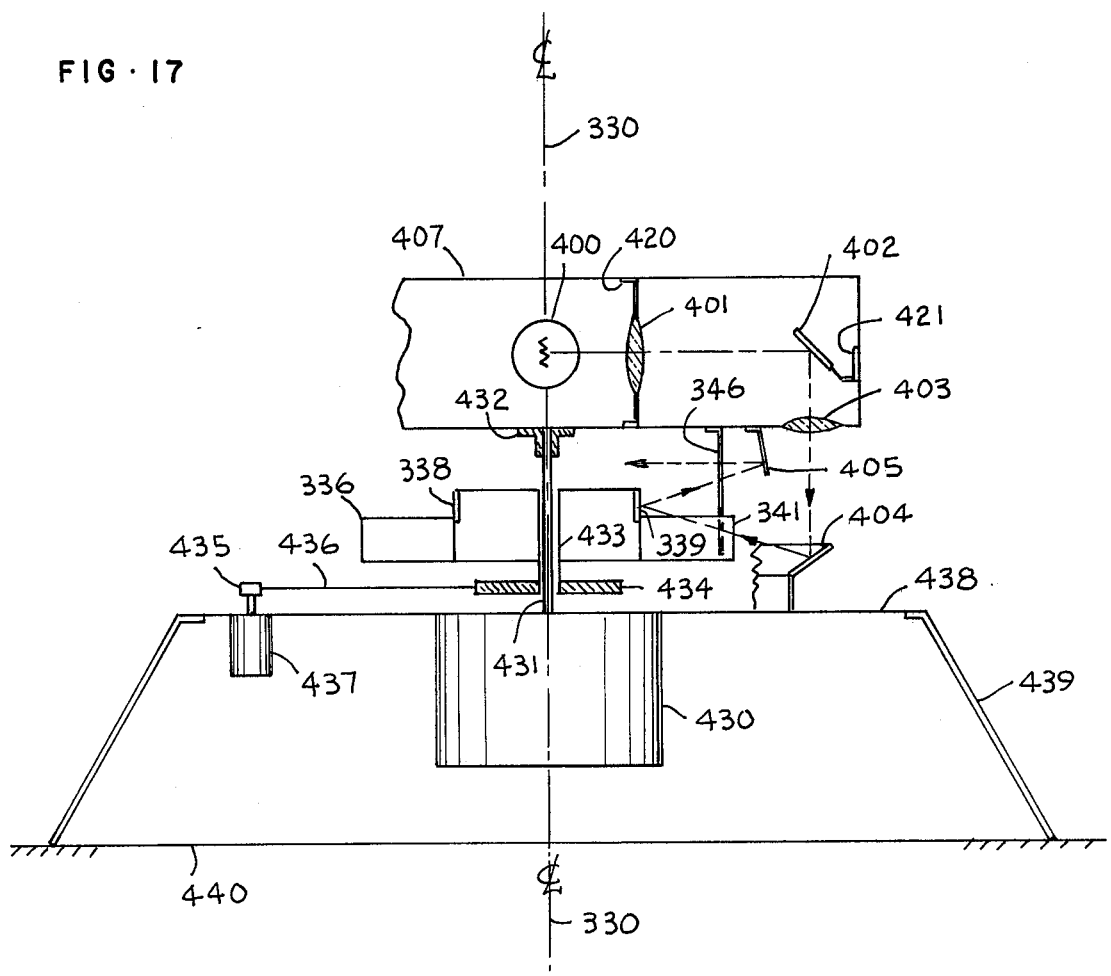

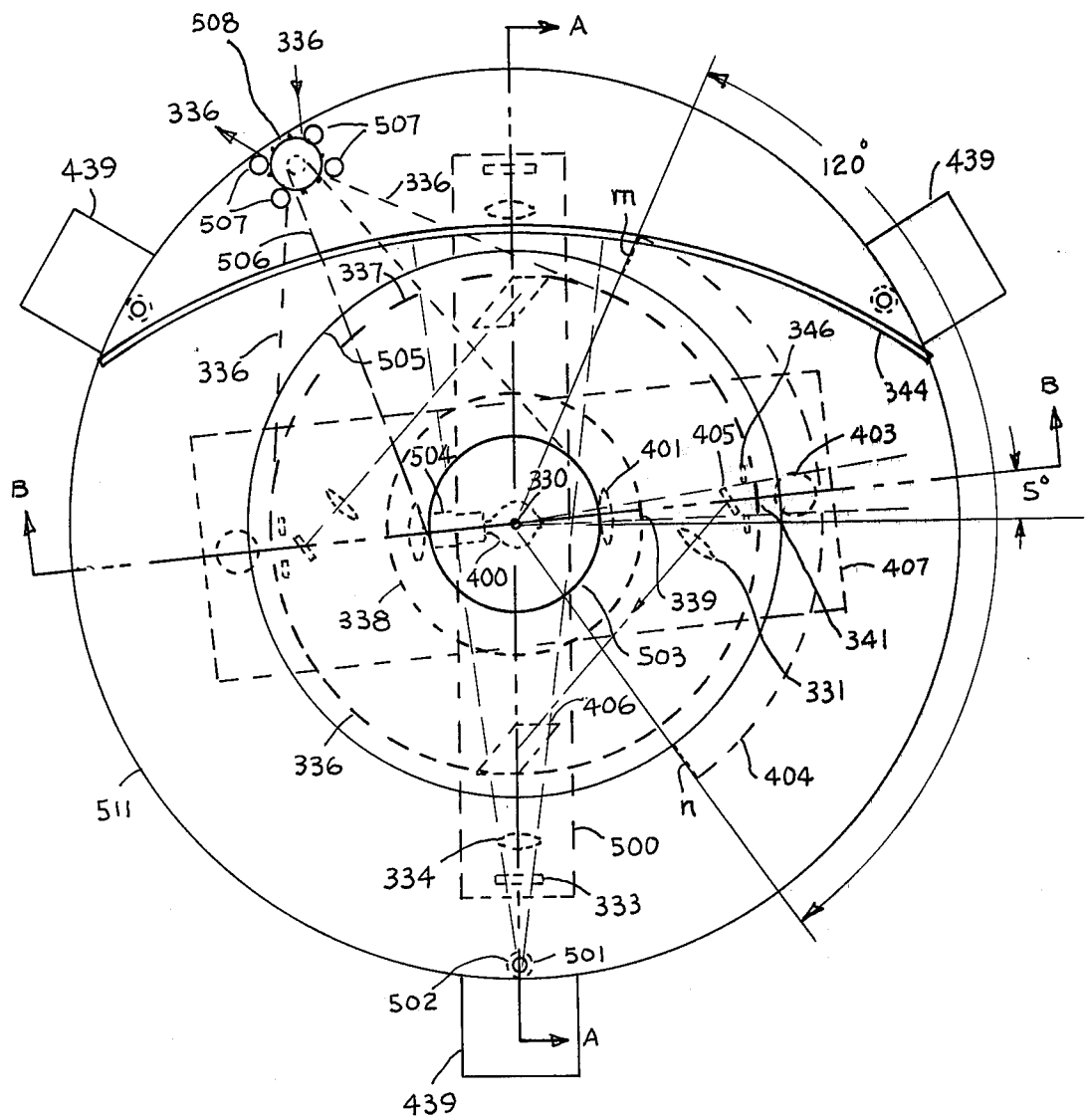
FIG·18A

STEREOSCOPIC MOTION PICTURE SCANNING REPRODUCTION METHOD AND APPARATUS

CROSS-REFERENCES TO RELATED APPLICATIONS

With reference to my U.S. Pat. No. 3,178,720 of Apr. 13, 1965, my new invention is significantly different. U.S. Pat. No. 3,178,720 describes an incremental rotation of the camera image about the optical axis as the camera photographs successive pictures around the scene. The reproduced pictures were incrementally rotated and swept 360°. The pictures were projected on a translucent screen at the end of a revolving drum at right angles to its rotation axis and pictures were imaged by a revolving mirror.

In my new invention there is no incremental rotation of the camera image about an optical axis as the camera successively photographs the scene. In this invention, the images are formed successively on the recording media in a manner parallel to each other. Continuous and conventional motion pictures are taken of the scene and stereoscopic clues are provided during the relative motion of the camera with respect to the scene. The camera, transported in a moving vehicle, can remain essentially fixed relative to the vehicle during photography from a moving vehicle or car. The scene is laterally scanned at some angle of inclination or declination while the camera is physically in motion relative to the scene. The reproduced pictures, in my new invention, are not incrementally rotated.

In U.S. Pat. No. 3,178,720, the film is moved rapidly past a fixed projection point. In my new invention, the processed motion picture film moves at the conventional rate of 24 frames per second while a very fast optical scanner passes by the film and selectively projects pictures on the screen in a sweeping fashion.

In my new invention the pictures are not projected onto a translucent screen at the end of a revolving drum but instead the pictures are sequentially swept across a semi-specular curved screen and not associated with a drum.

With reference to another of my U.S. Pat. No. 3,324,760 of June 13, 1967, my new invention is also significantly different. U.S. Pat. No. 3,324,760 describes a radial high frame rate sweeping projector that projects onto the inside surface of a surrounding concentric cylindrical screen. A thin vertical viewing slit followed the laterally shifting picture. The slit locus was concaved to the observer. Several radial projectors were employed that projected contiguous pictures that both swept and changed perspective with time. A real vertical slit in an obturative drum was used to force the observer's eyes to see various vertical slices of picture information until each eye had an entire picture scanned for it. Eyes were forced to occupy space on the opposite side of the slit locus with respect to the cylindrical screen.

In U.S. Pat. No. 3,324,760, the optical axes of successive pictures passed through the center of rotation during both projection and viewing. My new invention has a parallel and translating optical axis during the image reproduction and viewing. The viewing slit in our new invention is not constructed from a physical opaque drum but instead is formed by diverting the screen return light to a horizontally sweeping vertical exit pupil (referred to as a pseudo slit in the detailed description of the drawings). The slit locus is convexed to the viewer and the observer's eyes can be located either between the screen and pseudo slit, on the pseudo slit or at infinity as measured from the front reflective surface of the screen.

With reference to another of my U.S. Pat. No. 3,815,979 of June 11, 1974, my new invention is also significantly different. In U.S. Pat. No. 3,815,979, the camera assumed sequential positions along a circular arc while the camera at each location had its optical axis aimed toward a point on the opposite side of said circular arc as viewed from a plan view. In the stereoscopic image reproduction a fixed location high frame rate projector was used to project onto a fixed screen location the sequential pictures photographed by the successive camera locations. The screen geometry made of vertical rotating elements, swept the pictures in a manner such that each frame's optical axis passed through the aiming point replica of the photographing aim point. The projection aim point was located in the center of a curved screen. The successively projected different views of the scene were all aimed at a fixed screen position or aim point.

My new invention does not use an aim point in either the photographing or image reproduction. In addition the image reproducer uses a new rapidly scanning optical system that causes a swept series of successive views of the scene to move across the semi-specular screen. The screen has no rotating elements and each frame's projected optical axis passes through the center of the optical scan rotation while the reflected image leaving the screen has a translating and parallel optical axis wherein the viewer observes the reproduced scene through the horizontally moving vertical pseudo-slit. The reproduced stereoscopic scene is independent of film motion. The scene is in motion when the film is in motion. Both still and moving scenes provide stereoscopic viewing without optical aids at the observer's eyes.

BRIEF SUMMARY OF THE INVENTION

My invention relates to a system of recording and stereoscopic viewing of scenes and particularly to a method and means for accomplishing this purpose without viewing aids at the eyes of the observers.

Man has sought for decades to reproduce scenes in stereoscopy without the use of viewing aids at the eyes of the observers and in a manner such that a number of persons might view such scenes at one time and without restriction as to their various individual positions.

I have found that by presenting a relatively large number of related images of the scene to be viewed behind a rapidly moving vertical pseudo optically generated slit aperture the parallax thus occurring prevents one eye of each observer from seeing what the other eye sees at any and every instant of time. The aperture being in motion, each eye sees a complete image within a short interval of time. I make this interval within the presistance of vision for human observers. The brain fuses the two eye observations into a single stereoscopic view image, as my practical results predicate.

Accordingly, I am able to present a stereoscopic view of a scene to one or any reasonable number of viewers. If any or all of the viewers walk around my apparatus they will see the scene in different aspect, just as though they walked around the same scene in real life.

If the scene is reproduced from a series of stationary transparencies taken around the scene according to my method and apparatus the objects within the scene are stationary and a still stereoscopic picture is obtained. If the scene is reproduced from a series of moving transparencies photographed by a motion picture camera such that a relative motion occurs between the camera and scene and the images are reproduced according to my invention, stereoscopic motion pictures are obtained. Motion within the scene will be included and reproduced in the stereoscopic motion picture as well as the scene and camera relative motion.

Considering my system in greater detail the perspective that one eye of any observer sees is made up of discrete vertical lines of image information taken at discrete instants of time. At these same instants of time the other eye of that observer sees a completely different perspective. The net perspective for the two eyes is different, of course, because the eyes are not coincident in space, but are spaced apart horizontally, as is well known. Considering the image as an entity, it is dissected in time and in space.

An object of my invention is to provide viewing of three dimensional images without the use of viewing aids at the eyes of the observer.

Another object is to provide a stereoscopic system in which various perspectives of the scene viewed may be obtained by changing one's position around the reproducing apparatus.

Another object is to provide a stereoscopic system in which various perspectives of the scene viewed may be obtained by changing one's position within the surrounding reproducing apparatus.

Another object is to provide a basic stereoscopic motion picture method applicable to known and existing forms of image acquiring processes.

Another object is to provide means for reproducing stereoscopic images that are relatively rugged and are suited to retain adjustments in practice.

Other objects will become apparent upon reading the following detailed specification and upon examining the accompanying drawings, in which are set forth by way of illustration and example certain embodiments of my invention.

BRIEF DESCRIPTION OF ALL DRAWINGS

FIG. 6 shows a simplified plan view of a screen geometry used for reproducing stereoscopic scenes from pseudo-scopic scenes according to my invention.

FIG. 7B shows a simplified means to reproduce a finite number of image points for a viewer's eye according to my invention.

FIG. 8 shows the merging action of adjacent sweeping pictures on the screen for four out of the infinite number of projector scan locations for the reproduction of stereoscopic scenes according to my invention.

FIG. 9A shows a single sweeping projector and its optical effect on the observer's eye for incident parallel rays when the projected image does not change.

FIG. 9B shows a view similar to FIG. 9A except for incident image rays that approach the eye from various angles.

FIG. 10A shows an embodiment of a mirror drum film motion optical compensator and circular arc of motion picture film used for optical compensation of projected stereoscopic pictures according to my invention.

FIG. 10B shows an enlarged view of the central image formation in the optical compensator used in my invention.

FIG. 11A shows a side elevation view of an alternate embodiment of a centralized multi-facet rotating prism film motion optical compensator used for optical compensation of projected stereoscopic pictures according to my invention.

FIG. 11B shows one half of a plan view of FIG. 11A. The missing half is symmetrical.

FIG. 12A shows an optical schematic of the mirror drum operation where the focal plane shutter exposes one half of each of two adjacent film frames.

FIG. 12B shows an optical schematic of the mirror drum operation where the focal plane shutter exposes more of one picture frame than the other of two adjacent film frames.

FIG. 12C shows an optical schematic of the mirror drum operation where the focal plane shutter exposes one picture frame only.

FIG. 13 shows an alternate mirror drum image motion compensator using corner reflectors.

FIG. 14A shows a simplified film to screen path for an image reproduction according to my invention.

FIG. 14B shows a plan view of the embodiment of FIG. 14A.

FIG. 14C shows a side elevation view of the embodiment of FIG. 14A.

FIG. 15 shows a simplified view of the pseudo slit generation and selective viewing of screen images according to my invention.

FIG. 16A shows a side elevation view of the light generation and image path for the image reproducer embodiment according to my invention.

FIG. 16B shows a plan view of FIG. 16A.

FIG. 16C shows an end view of FIG. 16A.

FIG. 17 shows a simplified side elevation view of the scanner and film motion relative to the mirror drum for the image reproducer embodiment according to my invention.

FIG. 18A shows a detailed plan view of the embodiment of the image reproducer according to my invention.

DETAILED DESCRIPTION OF DRAWINGS

Figure 1:
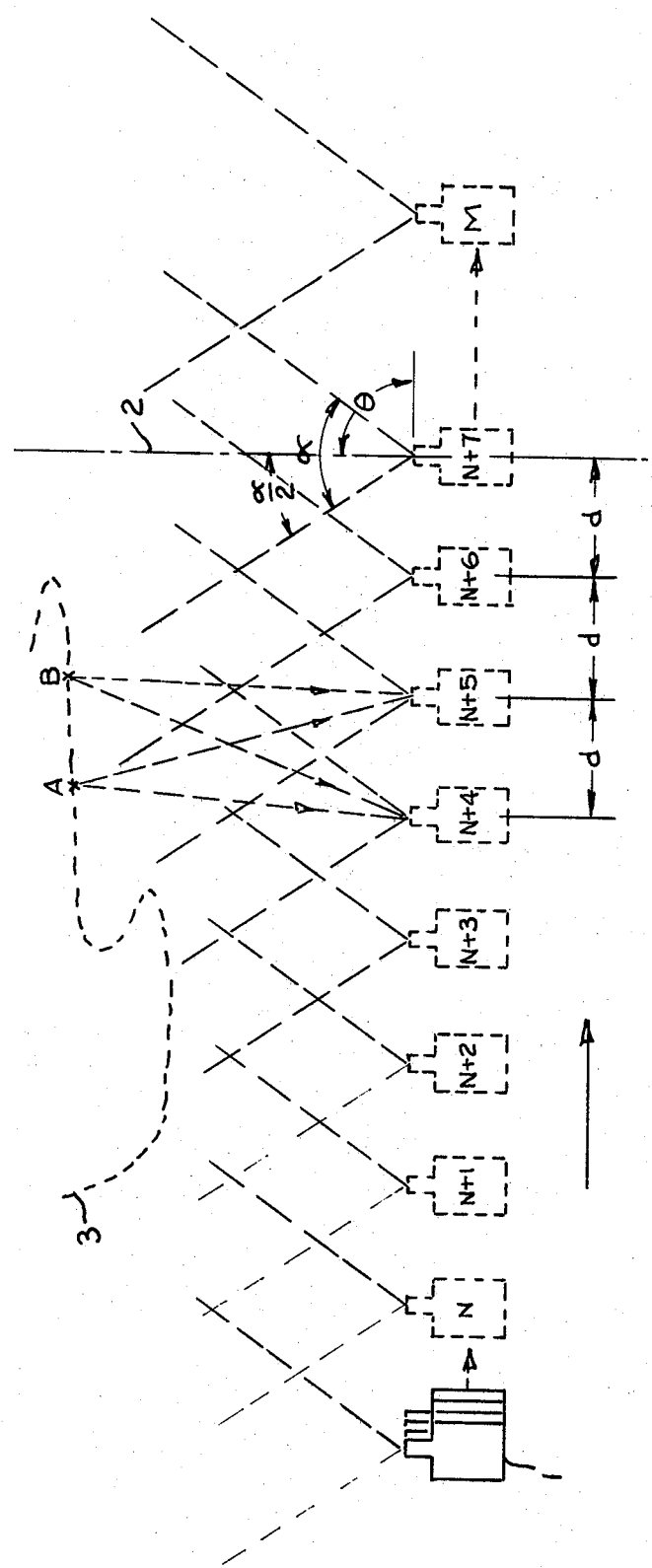
FIG. 1 shows a simplified plan view of plural cameras or a single moving camera used to photograph scenes according to my invention.

In FIG. 1, camera 1 is shown at several positions in time along a path beginning with N and ending with M. These camera positions are all separated by distance $d$. The optical axis 2 remains parallel for each of the camera positions. The field of view $\alpha$ is the same for each of the camera positions. The angle $\theta$ between the optical axis and the line joining the optical nodes of each of the camera positions is variable from zero to 180°. The vertical inclination of the camera's optical axis is variable from zero to 180°. Beyond the zero to 180° horizontal and vertical limits, the image becomes pseudoscopic. Although FIG. 1 shows a single translating motion-picture camera moving over an infinite number of positions in a given time while sequentially photographing scenes at indicated intervals along the path, FIG. 1 can also represent several fixed cameras at intervals $d$ arrayed to accomplish the same task. In this case, the different cameras in the array of fixed cameras, may operate sequentially or simultaneously. Simultaneously operated fixed cameras would not capture time related scene motion. FIG. 1 shows a typical scene 3 with arbitrary object points A and B which are in the field of view of camera positions N+4 and N+5.

The convention of time increase from left to right is maintained although the camera may also traverse the opposite direction provided appropriate corrections to the optical path are imposed on the reproduction hardware. This will become evident upon further reading of the detailed drawing description.

In practice, the scene is captured from a moving vehicle traveling at any speed. The inter-relation of the camera's translational velocity and the motion picture frame rate result in an apparent image size and distance change in the reproduced scene. For a given frame rate, as the translation velocity increases, the size and distance of the resultant spatial image decreases.

The working model constructed to demonstrate my invention utilized a standard 16mm motion picture camera held in the normal manner without any extraneous encumbrances to photographing scenes in nature. Any film format size can be used provided the camera and reproducer are designed to accomodate that particular film format size.

Figure 2:
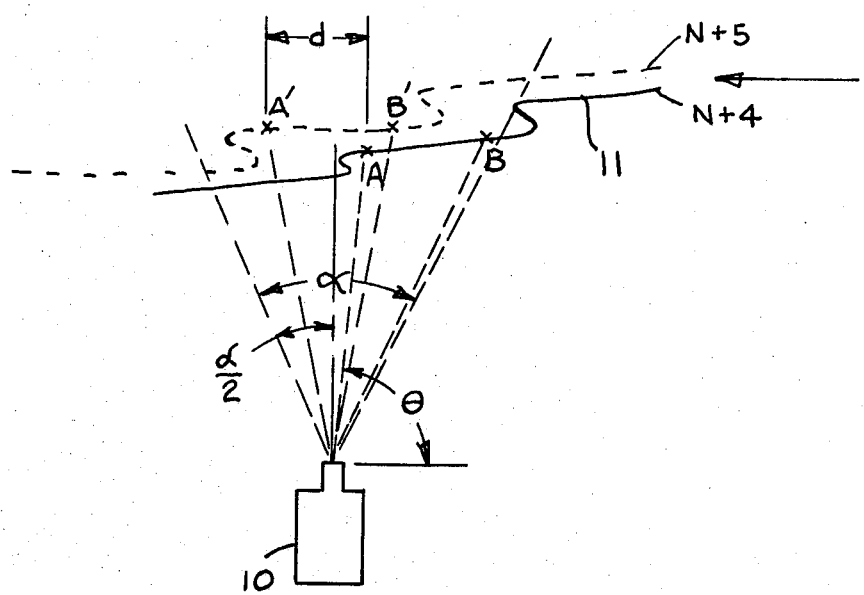
FIG. 2 shows a simplified plan view of an alternate stationary motion picture camera used to photograph pictures according to my invention, and a laterally moving scene.

In FIG. 2 motion picture camera 10 is operated in a fixed location while photographing moving scene 11. The resultant views are similar to those of FIG. 1 as object points A and B are viewed at positions N+4 and N+5. At position N+5 the object points are labeled A' and B' and are shifted a distance d from A and B similar to the inter-camera spacing of FIG. 1. Both $\alpha$ and $\theta$ have the same constraints as described for these symbols in FIG. 1.

Figure 3:
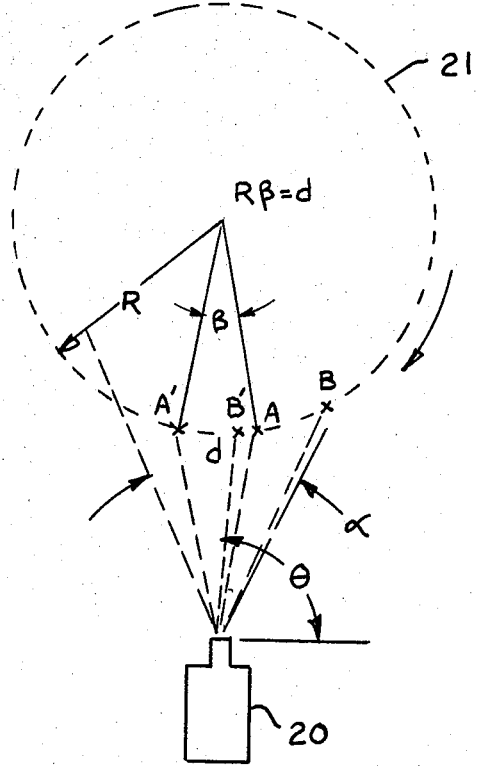
FIG. 3 shows a simplified plan view of an alternate stationary motion picture camera used to photograph pictures according to my invention, and a scene rotating on a turntable.

FIG. 3 is similar to FIG. 2 except the objects to be photographed by the stationary motion picture camera 20, are located on a rotating platform 21 which is rotating in the direction shown by the arrow. The relative direction of motion between camera and scene for FIG. 1, FIG. 2, and FIG. 3 are identical. This constraint is required for a common reproduction hardware design but can be modified by appropriate hardware modification to re-orient the images to assure stereoscopic rather than pseudoscopic pictures.

Figure 4A:
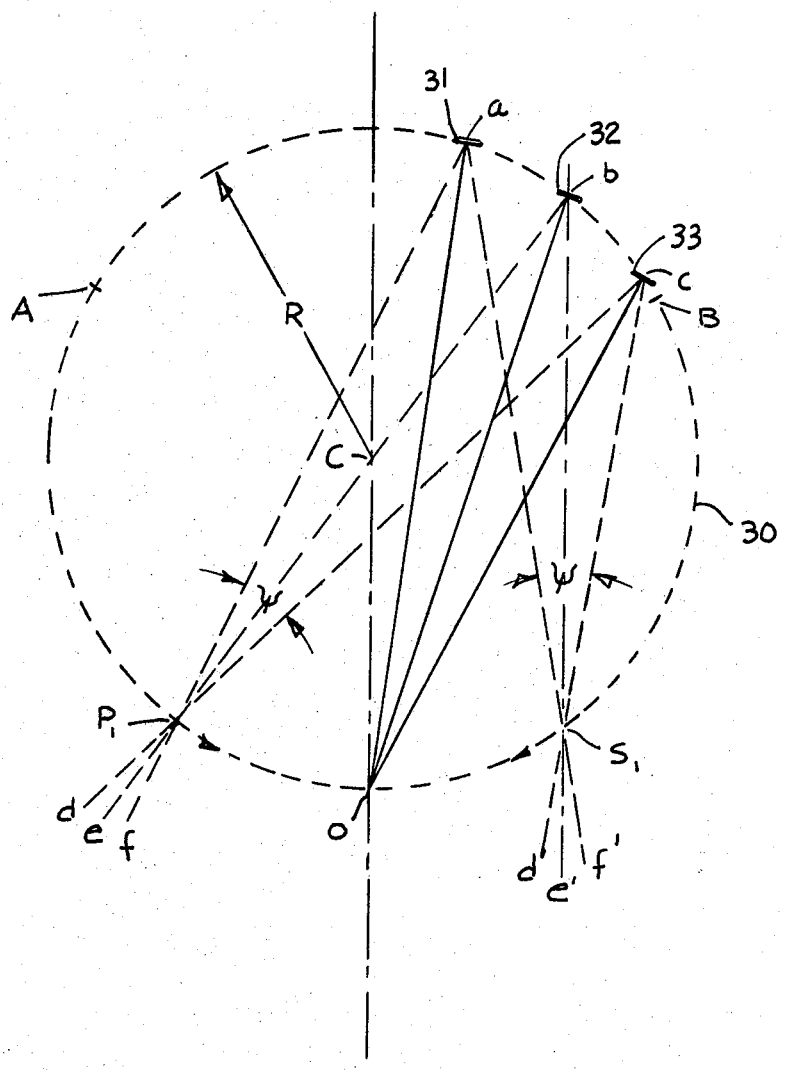
FIG. 4A shows a simplified plan view of the geometry and operation of the pseudo slit method of image reproduction according to my invention.

In FIG. 4A, reference circle 30 of radius R about center C, contains the scanning projector node shown at $P_1$ and is one of several scan locations along the periphery of 30. Three arbitrary rays $d$, $e$, and $f$ are shown projected from $P_1$ and encompassing angle $\Psi$ onto three elements of the viewing screen 31, 32, and 33. Screen element 31 is at location $a$. Screen element 32 is at location $b$. Screen element 33 is at location $c$. Although only 3 screen elemental locations are shown there is a multiplicity of elements over the entire screen width from A to B. The screen is composed of reflective elements that have surfaces normal to a line extended to position $o$ on circle 30. The screen elements horizontally reflect and vertically scatter the incident rays as described in subsequent figures. Horizontal reflection brings all incident rays to a pseudo vertical slit $S_1$ located on circle 30 such that the central projection ray $eb$ passing thru circle 30 center C is reflected as ray $be'$ and parallel to construction line $co$. The exit pseudo slit $s$, is always the same distance from $co$ as is $P_1$ and rotates in the opposite direction on circle 30. The reflection of the related rays $af'$ and $cd'$ produce the same angle $\Psi$ as the projector's related rays $fa$ and $dc$.

Figure 4B:
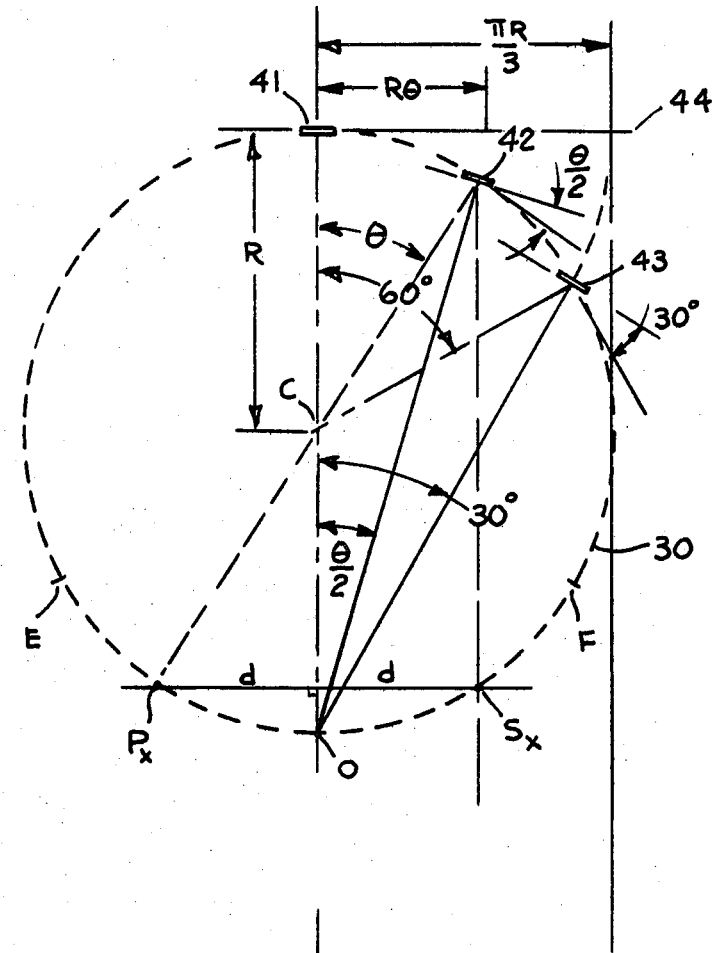
FIG. 4B shows a plan view of the geometry for the ideal screen used in the reproduction of scenes according to my invention.

In FIG. 4B the geometry is shown for screen element construction pursuant to the development of a Fresnel type screen made of individual vertical segments such as 41, 42, and 43 along circle 30. Such a screen can be constructed on a surface that is conformed to radius R about circle center C such that the reflective screen elements will be properly oriented.

Arbitrary projector position $P_x$ can move anywhere along the bottom portion of circle 30 over a practical range of about 120 degrees between positions E and F. As $P_x$ moves, the pseudo slit moves in the opposite direction to $P_x$ along circle 30 such that the distance $d$ between $P_x$ and OC equals the distance $d$ between $S_x$ and OC. $S_x$ carries the image of all rays leaving the node of the projector lens at position $P_x$. Because of the vertical scattering of rays incident on the screen elements, an eye located anywhere along vertical pseudo slit $S_x$ will see a complete and very bright picture as reflected off the multiplicity of screen elements.

The arc length from the center of screen element 41 to any screen element such as 42 subtending an angle of $\theta$ radians at C is R $\theta$. The angle that the screen elemental surface, such as 42, makes with the tangent to the construction circle 30, is ($\theta/2$). Element 43 is a related screen element at an angle $\theta$ equal to ($\pi/3$) radians or 60 degrees. The linear development is shown for each of the screen element locations along construction line 44.

Figure 4C:
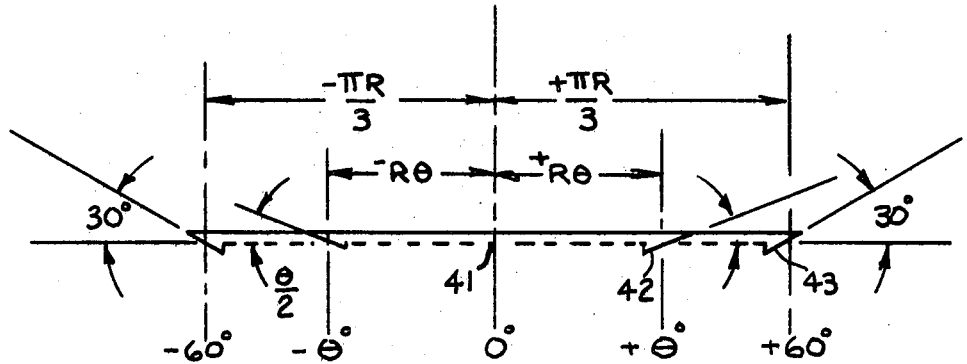
FIG. 4C shows a Fresnel type ideal screen construction geometry used to develop the screen used in FIG. 4B.

FIG. 4C is the flat Fresnel generation requirements for the screen depicted in FIG. 4B. Elements 41, 42, and 43 are again shown with their ($\theta/2$) angular relationship and their distance formula relative to the center of the screen which is element 41. The geometry to the left of the zero degree point in FIG. 4C is indicated as negative and is the exact mirror-image of the geometry to the right of the zero ° point. The end elements are shown for a 60° angle of $\theta$ but could be more or less than this value depending on the screen size and viewing angle desired.

Figure 5A:
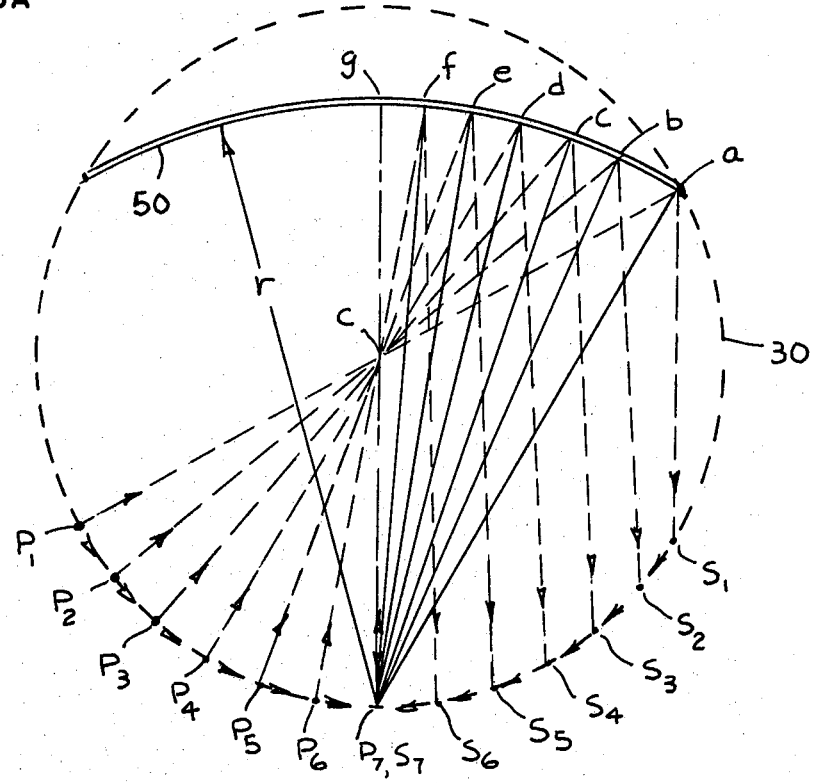
FIG. 5A shows a simplified plan view of an alternate screen and its geometry of operation as used in the reproduction of scenes according to my invention.

FIG. 5A shows a plan view of an alternate geometry for a horizontally reflective and vertically diffusing viewing screen 50 having a radius of curvature $r$ with its center C located at the center of the projector scan locus circle 30. The scanning projector locations are shown at seven different positions in time as $P_1$ through $P_7$. The corresponding pseudo slit positions occuring over the same time interval of scan are shown as $S_1$ through $S_7$. The scan direction of the projector is shown as counterclockwise and the scan direction of the pseudo slit is shown as clockwise. Only the central projection rays are shown corresponding to the projector's optical axis. Ray $P_1a$ reflects from screen 50 at position $a$ and the reflected ray $aS_1$ intersects circle 30 at $S_1$. All rays leaving $P_1$, regardless of direction and incidence on screen 50, will reflect to intersect $S_1$. The same geometry is also true for any other position of the scanning projector $P_2$ through $P_7$. Each pseudo slit position, being at a mirror image of the projector position about line $gcP_7$, will gather all reflected rays emanating from its respective projector location. Rays $fS_6$, $eS_5$, $dS_4$, $cS_3$ and $bS_2$ are not exactly parallel to reference line $P_7Cg$ but each extend toward an intersection with line $P_7Cg$ which is progressively farther out along line $P_7Cg$.

With reference to the photographing means of FIG. 1, the camera optical axis 2 remains essentially parallel during each of the successive frames of view and because of this geometry it is desirable in FIG. 5A that the successively reflected projector optical axis rays remain parallel. In practice however, it has been empirically verified that the degree of departure of the reflected central rays from the ideal parallel condition where each reflected ray is parallel to reference line $P_7Cg$, is not significant in the stereoscopic picture construction. This lack of parallelism in reflected central rays and the tendency for projected pictures to laterally keystone in shape as the projector scans further out from position $P_7$ toward $P_1$, has led to my calling this screen a suitable compromise alternate screen to the ideal screen.

Figure 5B:
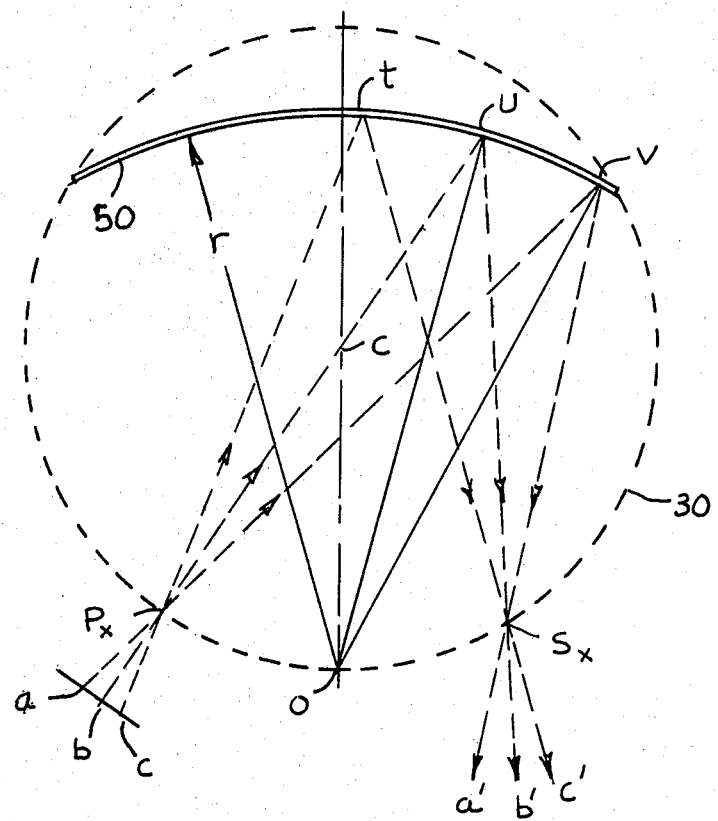
FIG. 5B shows additional geometry related to FIG. 5A to portray the geometry of related projection rays.

FIG. 5B shows the same alternate screen 50 as in FIG. 5A except an arbitrary scanning projector $P_x$ along the scan locus circle 30 is shown radiating related projection rays $a$ and $c$ in addition to the optical axis ray $b$. Rays $a$, $b$, and $c$ reflect off of screen 50 in a horizontal plane at screen locations $v$, $u$, and $t$ where they proceed toward pseudo slit position $S_x$ and emerge as $a'$, $b'$, and $c'$ from $S_x$. The arc distance $P_xO$ equals $S_xO$ in FIG. 5B. $P_x$ and $S_x$ travel in the opposite directions along scan locus circle 30 and are coincident at position O.

Figure 5C:
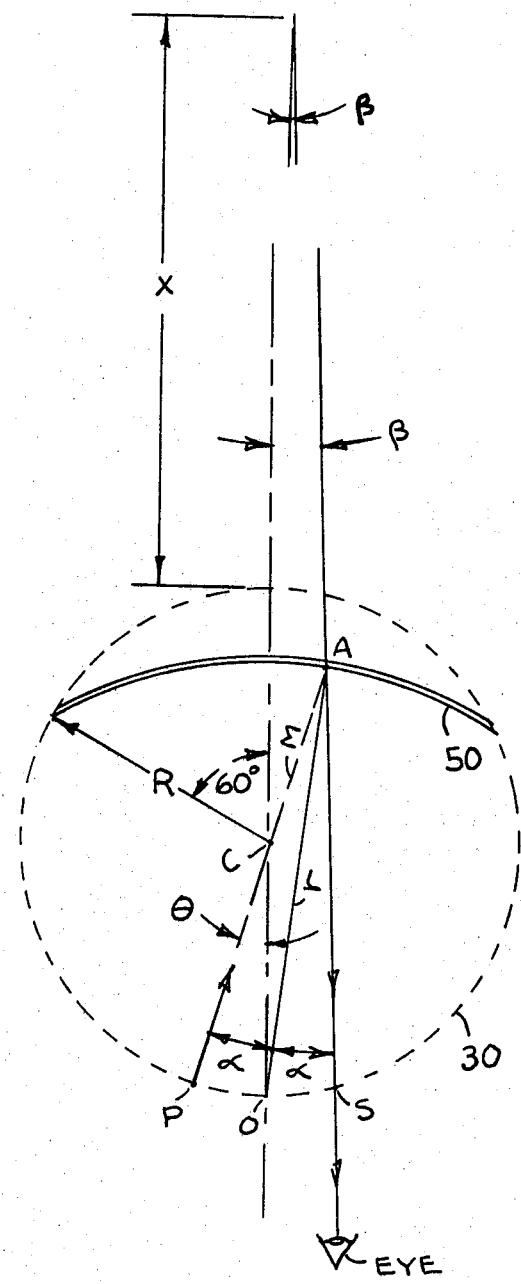
FIG. 5C shows the geometry for the mathematical analysis of the alternate screen of FIG. 5A.

FIG. 5C shows the geometry for mathematically determining the distance (X + R) related to the intersection of the extended reflected projector optical axis SA with the extension of construction reference line OC. An arbitrary projector position P along scan locus circle 30 subtends an angle $\theta$ at the center C of circle 30 having a radius R. The projector P optical axis PCA reflects from screen 50 at A and the reflected ray intersects circle 30 at S where it continues to the observer's eye. Screen 50 has a radius $r$ with center at $o$ on circle 30. The optical axis of projector P makes an angle of incidence and reflection of $\alpha$ with respect to the screen normal OA. The screen is shown subtending a 60° half angle with respect to circle 30 with center C. Angle $\beta$ is the small angle between the extension of OC and SA. M is the variable distance from C to A and depends on the value selected for $\theta$.

Mathematical relationships for FIG. 5C are shown herein. A finite number of values for $\theta$ are selected with the corresponding values of X + R indicated. The ideal screen would show all X + R values at infinity while the alternate screen shows values ranging from 5.5 R to infinity.

| MATHEMATICAL RELATIONSHIPS FOR FIG. 5C | |
|---|---|
| $\sin \alpha = \dfrac{\sin \theta}{\sqrt{3}}$ | |
| $\beta = 2\alpha - \theta$ | |
| $M = \dfrac{R \sin(\theta - \alpha)}{\sin \alpha}$ | |
| $X + R = \dfrac{M \sin 2\alpha}{\sin \beta}$ | |
| Plot Points $\theta$ | Resultant Values X+R |
| 5 | 5.50 R |
| 10 | 5.65 R |
| 20 | 5.85 R |
| 30 | 7.25 R |
| 40 | 9.50 R |
| 50 | 16.50 R |
| 60 | Infinity |

NOTE:
for small $\theta$,
$$X + R = \frac{2R(\theta - \alpha)}{2\alpha - \theta}$$

$$\alpha = \frac{\theta}{\sqrt{3}}$$

and X + R = 5.5 R

Figure 5D:
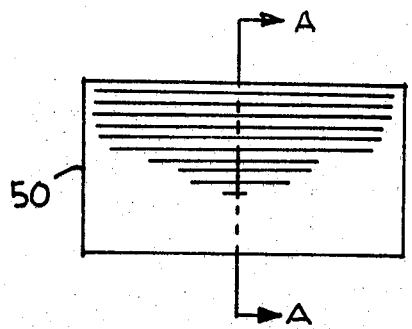
FIG. 5D shows a front view of the alternate screen of FIG. 5A.

FIG. 5D shows a front view of the alternate reflective screen 50. The reflective corrugated ridges are depicted by the horizontal lines. These lines have a pitch in practice of about 200 lines per inch (measured in a vertical direction) so as to render them imperceptible to the observer's eye. These horizontal ridges extend over the entire screen width and entire screen height. In my model of my invention, the screen width is about 12 inches and the height is about 6 inches. Although my small demonstration model was constructed to prove the principle, the same principles may be employed to construct a much larger size stereoscopic viewer. The horizontal ridge pitch for the screen as measured in the vertical direction, should be such that no more than 1 minute of arc is subtended at the eye of the nearest observer in the audience.

Figure 5E:
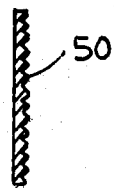
FIG. 5E shows a cross sectional view of FIG. 5D.

FIG. 5E shows an exaggerated cross sectional view AA of screen 50 taken from FIG. 5D. The shape of the corrugated elements in the screen is not too critical except if they are too steep the vertical scatter angle is excessive and the screen brightness in the forward normal direction is attenuated. It is found in practice that a 1/32 inch thick stainless steel screen with a satin No. 4 polish having 240 grit is ideal for both horizontal reflection and non-excessive vertical scatter of the light incident from the scanning projectors.

Figure 5F:
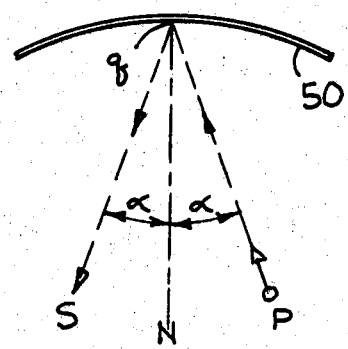
FIG. 5F shows a plan view of FIG. 5D.

FIG. 5F shows a plan view of screen 50. The screen normal is shown as $qN$. An arbitrary scan projector located at P projects a ray Pq at angle α to Nq and the reflected ray qS also makes an angle α with Nq. This reflective geometry for screen 50 is typical for any location of P and any ray projected from P.

Figure 5G:
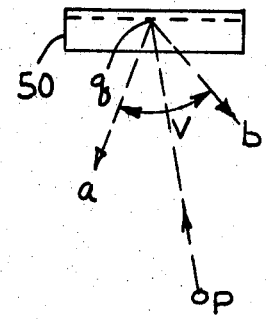
FIG. 5G shows a side elevation view of the alternate screen of FIG. 5F.

FIG. 5G shows a side elevation view of FIG. 5F and the same projected ray Pq is shown slightly inclined from normal in order to not render it a special case. The scattered rays from the screen incident point q range from a to b over an inclination angle of V which in practice can be about 45°. The intensity of the vertically scattered ray is essentially constant over vertical angle V.

Figure 5H:
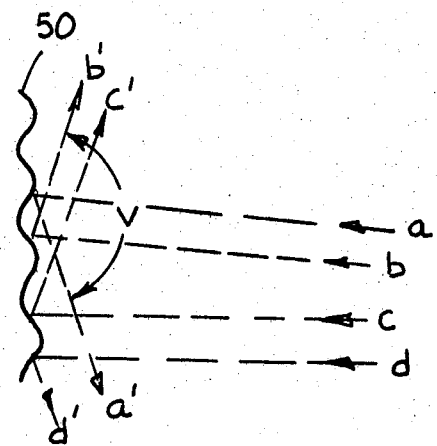
FIG. 5H is an enlarged view of a portion of FIG. 5E.

FIG. 5H shows a greatly enlarged section of the reflective front surface of screen 50. Incident rays a and b are approaching a trough (concaved) reflector and the reflected rays a' and b' extend over vertical angle V. Incident rays c and d are approaching a crest (convexed) reflector and the reflected rays c' and d' make a vertical scatter angle about the same as for the trough reflector.

FIG. 6 shows a plan view of an alternate screen geometry in which a two-sided mirrored surface 60 is positioned in a vertical plane OP which causes the scanning projector $P_x$ to return rays to the pseudo exit slit $S_x$ superimposed on $P_x$ and projected image orientation ab to be laterally reversed to $b_i a_i$. The optical axis $P_x C$ reflects off mirror 60 at C and travels to ideal screen element k where the reflection to $S_x$ is parallel to OC. The optical operation for scan projector $P_y$ on the right hand side of mirror 60 on scan locus circle 30 is identical to that for the $P_x$ projector on the left of mirror 60. Projected image orientation mn after reflection and return to the pseudo slit $S_y$, which is superimposed on $P_y$, undergoes a lateral reversion to $n_i m_i$ with the central ray $rS_y$ being parallel to OC.

In FIG. 4A, the scan projector and pseudo slit moved in opposite directions along the scan locus circle 30. In FIG. 6, the scan projector and pseudo slit both move superimposed and in the same direction. A clockwise direction has been selected as a convention for my invention but an opposite direction would suffice as well. The result from the addition of a two sided mirrored surface in FIG. 6 is to develop a pseudoscopic presentation of a stereoview or develop a stereoscopic presentation from a pseudoscopic view.

In FIG. 1, if the camera were pointed into the opposite hemisphere, the reproduced picture would appear pseudoscopic in our invention unless the mirror 60 of FIG. 6 were added to re-orient the view to be stereoscopic. This alternate screen geometry of FIG. 6 provides a means to free the photographer to point the camera into either hemisphere without having to grossly modify the reproduction hardware.

Figure 7A:
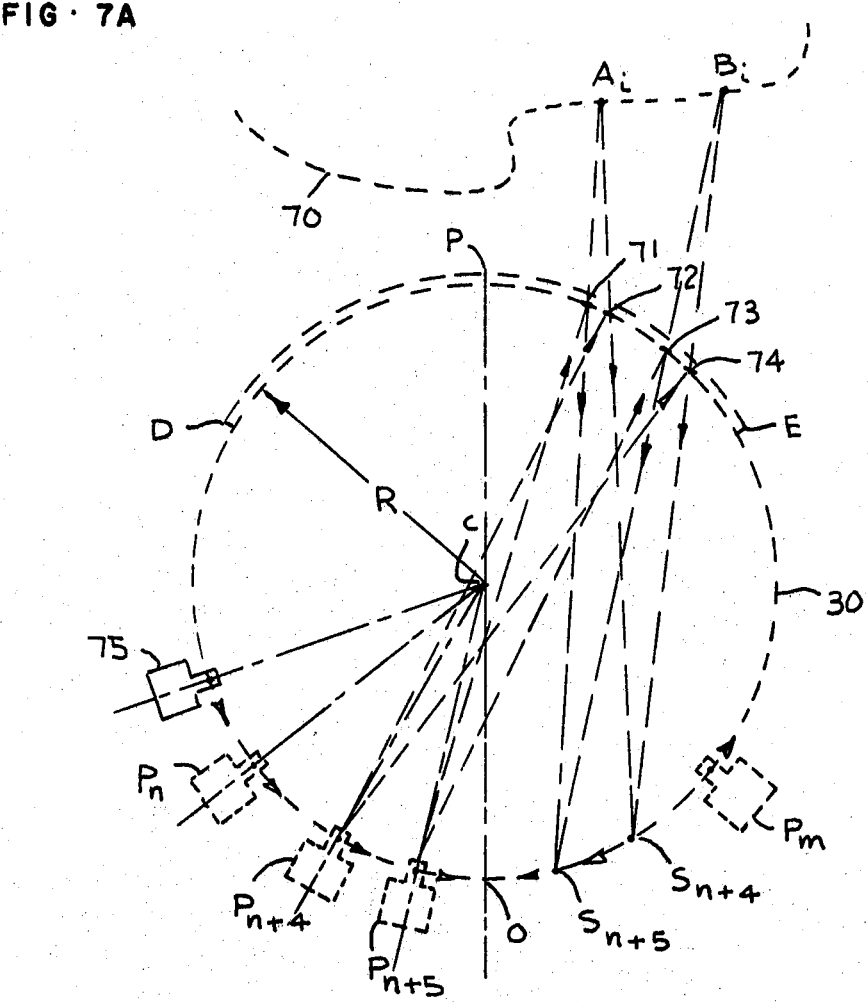
FIG. 7A shows a simplified plan view of a means for reproducing stereoscopic images using a sweeping projector and a screen geometry according to my invention.

FIG. 7A shows a plan view of the ideal screen geometry in which two scene image points $A_i$ and $B_i$ located on reproduced scene 70 (similar to object points A and B of FIG. 1) are ray traced from the scan projector 75 positions $P_{n+4}$ and $P_{n+5}$ to screen elements 71, 72, 73 and 74 and back to pseudo slit positions $S_{n+4}$ and $S_{n+5}$. The screen width is shown extending along scan locus circle 30 from D to E having radius R about center C. Scan projector locations $P_n$ through $P_m$ are similar to camera positions n through m in FIG. 1. Projector 75 at position $P_{n+4}$ has a lens node position 76 from which rays emenate. Projector 75 at position $P_{n+5}$ has a lens node position 77 from which rays emenate.

Pseudo slit position $S_{n+5}$ is the same distance from O along scan circle 30, as is $P_{n+5}$ and pseudo slit position $S_{n+4}$ is the same distance from O as is $P_{n+4}$. A ray from 76 reflects off screen mirror segment 72 and intersects scan circle 30 at $S_{n+4}$ and the ray 72 to $S_{n+4}$ is extended to reproduced image point $A_i$. Likewise another ray from 76 to screen mirror segment 74 is reflected to scan circle 30 to intersect at $S_{n+4}$ and the reflected ray from 74 to $S_{n+4}$ is extended to reproduced image point $B_i$. Rays 76 to 72 and 76 to 74 occur at the same instant in time. At a slightly different instant in time determined by the transit time for the scan projector 75 to move along scan circle 30 from position $P_{n+4}$ to $P_{n+5}$, rays are determined for image points $A_i$ and $B_i$ as the rays extend from pseudo slit position $S_{n+5}$. A ray from the projector 75 position $P_{n+5}$ node point 77 to screen mirror segment 71 reflects to intersect scan circle 30 at $S_{n+5}$. The reflected ray 71 to $S_{n+5}$ is extended to reproduced scene 70 to determine $A_i$. Likewise a ray leaving 77 to screen mirror segment 73 reflects to scan circle 30 at pseudo slit position $S_{n+5}$. The ray from 73 to $S_{n+5}$ is extended to reproduced scene 70 at image point $B_i$. In a similar fashion, rays from the scanning projector 75 at various positions in time along the scan circle 30, cause all image points within an arbitrary scene 70 to be generated at any given projector position.

FIG. 7B shows the manner in which three arbitrary image points (x, y and z) in reproduced scene 70, are viewed by an observer's single eye E through pseudo slit positions 84, 85 and 86 at different instants in time as the scan projector 75 moves through positions 81, 82 and 83 along scan circle 30. Scan projector 75 has a projection angle θ which is constant for all projection positions along scan circle 30. Locations 87, 88, 89, 90, 91, 92, 93, 94 and 95 all represent screen mirror segment reflection points from which the scan projector rays reflect projector light toward the corresponding pseudo slit positions 84, 85 and 86 along scan circle 30. All related rays separated by the angle θ such as 81 to 89 and 81 to 95, reflect to their corresponding pseudo slit position such as to subtend the same angle θ at the pseudo slit. Reflected ray from 89 to 84 and reflected ray from 95 to 84, are θ° apart at position 84. The projection optical axis 81 to 92 passes through scan circle 30 center C and reflects off screen mirror element 92 so that reflected ray 92 to 84 is parallel to the reference construction line CC. In a similar manner pseudo slit 85 reproduces the rays emenating from projector 75 position 82 and pseudo slit 86 reproduces the rays emenating from projector 75 position 83. Reflected central projection ray 91 to 85 and reflected central projection ray 90 to 86 are both parallel to the reference construction line CO.

Figure 7C:
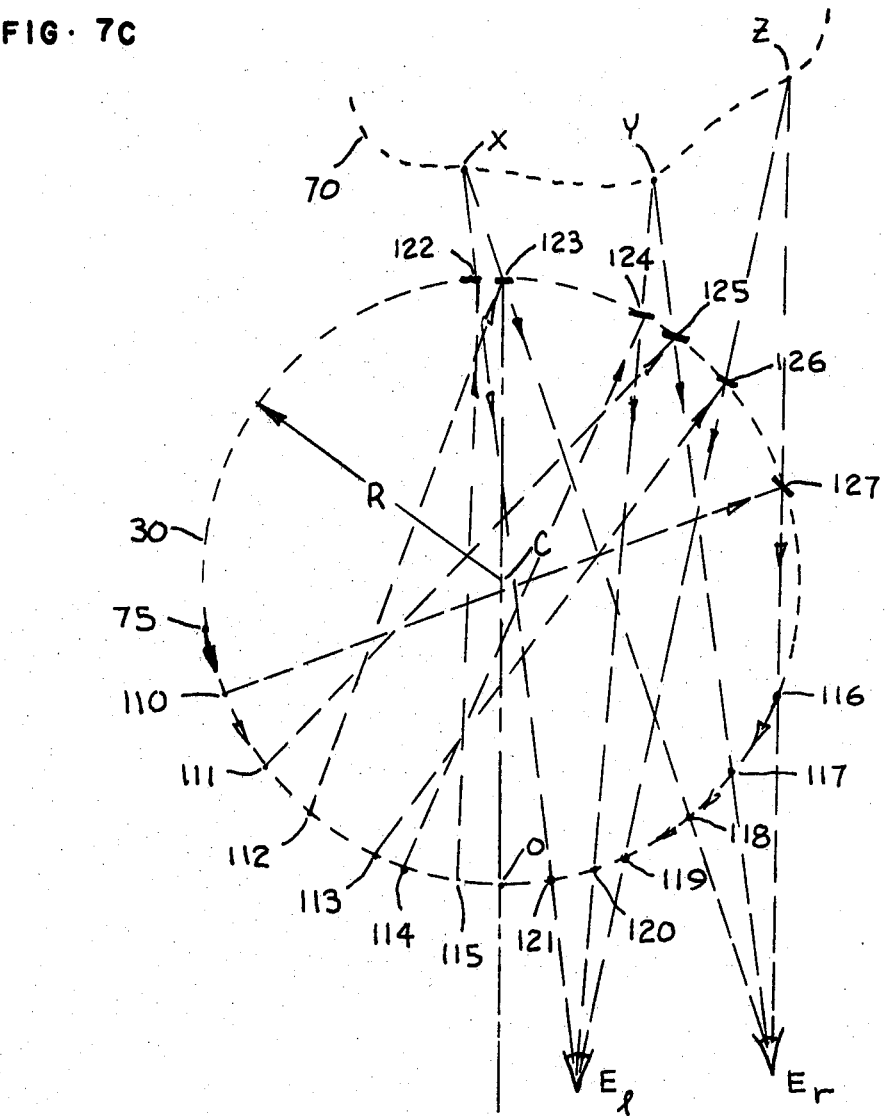
FIG. 7C shows a detailed description of the image reproduction of FIG. 7B without all related projection rays and involving both of the viewer's eyes.

FIG. 7C is similar to FIG. 7B in that scanning projector 75 is moving on the periphery of scan circle 30 at radius R about center C of which arbitrary scan locations 110, 111, 112, 113, 114 and 115 are definitized. The resultant scanning pseudo slit positions 116, 117 118, 119, 120 and 121 are also definitized. Arbitrary observer left and right eyes are shown as $E_l$ and $E_r$. The eyes are viewing the arbitrary reproduced scene 70 and in particular, image points x, y and z. Lines drawn from each eye to the image points x, y and z are reflected off screen mirror segments along the scan circle 30. Only those projection rays are shown that directly involve the actual construction of image point extended rays to the eyes. Eye $E_l$ views image point x thru pseudo slit 121 by reflection off screen mirror element 122 where the light originates in projector 75 at position 115. Likewise eye $E_r$ views image point x through pseudo slit 118 by reflection off screen mirror element 123 where the light originates in projector 75 at position 112. In a similar manner, all of the rays shown reproduce image points in the arbitrary reproduced scene 70 by originating from one of the projector 75 scan locations and being directed to the pseudo slit and eye by means of a screen reflective element.

FIG. 8 shows the manner in which one embodiment of my invention causes the projected image 140, taken from one frame of motion picture film, to move laterally on the projection screen while not vertically moving with respect to the screen reference line 142. Two successive projected frames of motion picture film 140 and 141 are shown in FIG. 8 at four arbitrary instants in time ($T_1$, $T_1 + \Delta t$, $T_1 + 2\Delta t$ and $T_1 + 3\Delta t$). Although only four instants in time are shown for simplicity, there is actually an infinite number of positions for the moving projected image frames accumulated over time interval $3\Delta t$. Projected frame 140 is shown complete at time $T_1$. Measurements $Y_1$, $x_1$ and $x_2$ establish certain fixed elemental positions within the projected frame 140. A wipe line WL is defined at screen reference line 142 at time $T_1$. As time progresses and frame 140 slides to the right by time interval $\Delta t$, the fixed elemental positions $y_1$, $x_1$ and $x_2$ remain stable. The wipe line WL, however, moves upward to bring in the next successive projected frame 141 having the image AB at the same $y_1$ position. At time $T_1 + 2\Delta t$ most of 141 is displayed, but the relative horizontal positions of common elements such as defined by measurements $x_3$ and $x_4$ are different from projected image 140 unless the object photographed in the scene was at infinity relative to the camera in FIG. 1. The relative vertical position of common elements such as defined by measurement $y_1$, remains fixed. At time $T_1 + 3\Delta t$ all of projected image 141 appears and no trace of projected image 140 is seen. The wipe line WL is at the top of the projected image and the projected image 141 has shifted laterally a distance D such that D equals the scan projector angular interval in radians (between time $T_1$ and $T_1 + 3\Delta t$) multiplied by the radius R of scan circle 30 in FIG. 7C. This action of successive projected images moving laterally across the screen while undergoing a wipe action in a vertical direction, continues for the several frames of motion picture film in a scan sequence. My invention model uses 26 such frames over a projection angle of about 120 degrees. The successive images are projected at a very high rate such that any given frame is refreshed or scanned at a rate to exceed the critical fusion frequency of about 50 times per second.

FIG. 9A shows that when scan projector 75 moves around scan circle 30 and passes through two arbitrary points 160 and 161 while the projected picture remained the same over the scan angle $\theta$, a ray representing a distant point at infinity in the scene located on the optical axis would reflect from screen mirror segments 164 and 165 to pseudo slit positions 162 and 163. Any common point in the frame leaving 160 at any projection angle would leave 161 at the same angle and would arrive at the respective pseudo slit positions 162 and 163, via suitable screen image element reflectors, at equal angles and would therefore appear parallel and of infinite distance to eye E. Because of this phenomenon, the embodiment of my invention includes a sweeping projected image to the screen surface so that a finite number of camera positions of FIG. 1 and a finite number of corresponding scan projector 75 locations of FIG. 9A effectively generate an infinite number of camera and projector positions for the viewer with eye E.

FIG. 9B shows the same projection geometry as used in FIG. 9A, except that off axis projection rays are shown where the viewer's eye E is presented with a scene which tends to fill in the shaded space as the node eye E is made to view the screen through vertical pseudo slits 163 and 162. The observer's eye E views the pseudo slit 162 and then 163 as the direction of pseudo slit scan is clock-wise with the scanning projector 75 motion from position 160 to 161. The eye E therefore sees screen image point 166 first which is at an angle $\alpha$ from the optical axis of scan projector 75 when at location 160. The eye E sees screen image point 167 next as the scan projector 75 moves to position 161 while projecting the same picture frame as for position 160. Screen image point 167 makes an angle $\beta$ with respect to the optical axis of scan projector 75 when at location 161. Since angle $\beta$ is smaller than angle $\alpha$ and the reflected ray 167 to 163 makes a relatively small angle to the reflected optical axis 169 to 163 and the reflected ray 166 to 162 makes a relatively large angle to the reflected optical axis 168 to 162, then it can be inferred that the eye is presented generally with information in the scene which is tending to fill in correctly during the projector 75 scan angle $\zeta$ subtended by projection locations 160 and 161. Lateral scanning of the projected image on the screen is a requirement for effectively viewing an infinite number of projector scan positions with only a finite number of scene frames actually used in my invention.

FIG. 10A shows an embodiment of film frame image processing according to my invention. A mirror drum image motion compensator was first used by French inventor Emile Reynaud (1844–1918) in a development known as the Praxinoscope wherein the Praxinoscope only projected two-dimensional pictures. The mirror drum compensator is not sighted in my invention but serves as one of several possible motion compensation methods. The drum method was chosen to reduce noise and the number of moving parts in my stereoscopic motion picture image reproduction system. Standard motion picture film 180 is formed in a circular arc about axis 181 having a radius of 2R. A mirror drum 182, is concentric with the film arc and has a radius R measured to the mirror segment surface located on the periphery of mirror drum 182. The number of mirror segments around the drum 182 periphery of which 186, 187 and 188 are contiguous examples, equals the number of frames of film 180 around a circle of which film frames 183, 184 and 185 are contiguous examples. The mirror segments each form an image of its corresponding film frame at the film arc center in represented images 189, 190 and 191 for film frames 183, 184 and 185 respectively.

FIG. 10B shows an enlarged view of the images formed at the center axis 180 and each image is oriented in a direction that faces its respective film frame. The angle between each of the film frame images 189, 190 and 191 is equal to the angle subtended at the center line 181 by the center of contiguous film frames (i.e. 183 and 184 or 184 and 185 of FIG. 10A). In FIG. 10A, corner points of film frame 184 are identified by letters $a$, $b$, $c$ and $d$. The corresponding image points $a_i$, $b_i$, $c_i$ and $d_i$ are shown in FIG. 10A and also more clearly in FIG. 10B for image 190 which is the image of film frame 184. For a stationary stereoscopic reproduced scene according to my invention, the relative position of film 180 and mirror drum 182 are held fixed and in the proper phase such that a line drawn from axis 181 to bisect any arbitrary film frame, will also bisect the corresponding mirror segment image former on mirror drum 182 for that particular film frame. For a motion picture stereoscopic reproduced scene according to my invention, the film 180 and mirror drum 182 are constrained to rotate together and in the proper phase as described above and at a rate commensurate with the scene motion being reproduced.

FIG. 11A and FIG. 11B show a side elevation view and partial plan view of an alternate stereoscopic image reproduction method which may be employed in lieu of the mirror drum compensator of FIG. 10A. A central multi-facet rotating prism 200 is used to compensate for the scanning motion of rotor 211 with respect to film frames on arc 201. The film arc is of constant radius about the scan rotator axis 230. The film radius is not critical and depends on the desired number of film frames within the scan field of view which in turn equals the observer's viewing field angle.

The half plan view of FIG. 11B is drawn around a vertical plane of symmetry 199 for simplicity and ease of presenting two related views in suitable size on a single page for better reference.

A stationary lamp 209 emits light through the rotor's condenser system (lenses 210 and 213 and mirror 212) which is scanned over a stationary conical reflector 214 to move around film arc 201. The central rotating prism 200 is appropriately geared by box 202 to the film motion and scanner 211 by means of non slip pulley belts 203 and 205 and gear pulleys 204 and 206. The spinning mechanism is supported by bearing 207 and 208. As a practical example of gear ratios, an experimental model with 96 film image frames per 360° and an 8 facet prism 200 requires an 11 to 1 gearing ratio between the rotating prism and the scanner 211 where both prism and scanner rotate in the same direction. This motion assures that each frame of film is scanned by its respective facet of the prism. The compensated images are projected onto a horizontally reflective and vertically dispersive semi-specular screen 221 (identical to screen 50 in FIG. 5A through 5H) by the projection optics consisting of projection lens 215, 90° image rotator 216 (such as a schmidt or dove prism), mirrors 217 and 218 and image spreading lens 219 which increases the projection angle. This approach, although feasible, was not used in favor of the mirror drum image motion compensator embodiment primarily because of the additional gear belts and attendent noise.

FIG. 12A, FIG. 12B and FIG. 12C show successive plan views of the wiping action of the focal plane shutter 300 as it sweeps over the film arc 301. The direction is arbitrarily shown as CCW but the operation is valid for CW as well. FIG. 12A shows shutter 300 exposing ½ of each picture frame 302 and 303 which are two frames of many along film arc 301. FIG. 12B shows a shutter 300 exposing more of frame 303 than of frame 302. FIG. 12C shows a shutter 300 exposing only film 303. Two successively photographed frames of motion picture film 302 and 303 are shown along with their images in their associated mirror facets 305 and 306. Motion picture frame 302 is bounded by points A and B while motion picture frame 303 is bounded by points C and D. Image points are designated by the subscript $i$ on letters. The mirror facets reside on an arc 304 equal to ½ the radius of the film arc. Although only two frames are shown, the same relation continues for film frame and mirror segment around the arc for whatever view angle is desired. The quantity of film frames utilized in the construction of my invention is eighty but this number may be reduced with some sacrifice in the 3-D view tending to take on a flat appearance with greater viewing distances from the unit. The center line of projection 307 always bisects the focal plane shutter 300 and extends from the center of Film Arc 301 position O. Since the image of the center of all of the film frames on film arc 301 coincides with position O, the film frame center sweeps the screen horizontally at an angular rate equal to the rotor scan-rate according to FIG. 8. The film frame center does not move vertically on the screen as the screen is swept with the multiple frames from the film arc according to FIG. 8. Since the picture is rotated 90 degrees before striking the screen, the plan view of FIG. 12A, FIG. 12B and FIG. 12C shows arcs AB and CD on 301 which represent the height of the picture. The picture width is represented by the film strip width. With respect to FIG. 12A where the centerline of projection 307 is on the border of film frames 302 and 303, the following relationships exist:

$A_i B_i$ is Frame 302 image in mirror segment 305.

$C_i D_i$ is Frame 303 image in mirror segment 306.

Because of the focal plane shutter 300, the right ½ of 302 is imaged in 305 at $OB_i$ and the left ½ of 303 is imaged in 306 at $OC_i$. $OA_i$ and $OD_i$ are black due to the focal plane shutter 300 blanking. With respect to FIG. 12B, where the centerline of projection 307 and shutter 300 have moved part way into film frame 303, the following relationships exist:

$E_i B_i$ is the unblanked portion of 302 image in 305.

$F_i C_i$ is the unblanked portion of 303 image in 306. $E_i B_i$ and $F_i C_i$ are complementary image sections of 302 and 303 and generate a completely continuous picture made up of a portion of frame 302 and a portion of frame 303. $A_i E_i$ and $D_i F_i$ are black due to focal plane shutter 300 blanking. With respect to FIG. 12C, where the centerline of projection 307 is in the midpoint of film frames 303, the following relationships exist:

$C_i D_i$ is the image of all of frame 303 which is totally unblanked by focal plane shutter 300 which allows light to pass through the entire 303 frame. Frame 303 is viewed by reflection off 306.

$A_i B_i$ is black due to focal plane shutter 300 blanking of film frame 302 as viewed in mirror segment 305. The mirror drum operation utilizing flat segments as 305 and 306 in returning compensated images to the motion picture screen has an effect which in practice causes a modulation in light during the sweep action which subsequently can cause the appearance of dark vertical bars between successively projected picture segments if the pseudo slit width is not equivalent to the radial space of one film frame. This light modulation has been attributed to the central scanning light beam along projection entrance aperture of the projection lens. An alternate means of eliminating the appearance of these dark vertical bars is shown in FIG. 13.

FIG. 13 shows an alternate means to implement the mirror drum compensator. Instead of using flat mirror segments as 305 and 306 of FIG. 12A through 12C, 90° flat mirror sections are arranged as shown in FIG. 13 with mirror segments 320 and 321 making a 90° angle with each other and having apex M located on circle 304 having ½ the radius of the film arc 301. With a mirror arrangement of this type, all images of the object points such as C and D are found by drawing a line from the object points through the apex M to an equal distance behind M to get image points $C_i$ and $D_i$ respectively. Because of this, the image formed in FIG. 13 is laterally reversed as compared with that of the mirror segments in FIG. 12 A through C.

This reversion is compensated for in the projector by means of suitable image re-orientation which may be of either prismatic or mirror type.

The unique geometry of the 90° mirror segments 320 and 321 is to reflect all rays of incident light parallel to the incident light. Since the scanning optical axis is coincident with 307, the main beam of incident light does not deflect away from the 307 axis as in FIG. 12A through 12C, but will reflect from the 90° mirror segments 320 and 321 to be parallel to 307. The net result is a sweeping series of alternating views on the viewing screen which remain of equal intensity and the vertical dark bars tend to disappear.

FIG. 14A is a simplified perspective drawing of the light path for the image reproducer embodiment according to my invention. The optical scanning mechanism consists of projection lens 331, 90° image rotator 332, mirror 333 and negative image spreading lens 334 and rotates about the rotation axis 330. The pseudo projection point 350 rotates about scan circle 335 at a rate such that point 350 returns to any given point on scan circle 335 about 50 times per second so as to avoid the sensation of flicker to the observer's eye. Although only one facet of projection optics is shown in FIG. 14A, any number of facets may be employed with a progressively decreasing projection scan speed as the number of facets is increased. My invention model contained two facets with the scanning rotor made up of the aforementioned projection optics, rotating at 1500 RPM or 25 RPS giving 2 image scans per revolution. Film 336 is shown wrapped around film guide 337 and proceeding to a film transport system not shown. Concentric with film guide 337 is mirror drum 338 with one mirror segment 339 shown. An arrow 340 is shown as an image on film frame 341. The arrow 340 represents a vertical up direction with respect to the photography of the scene in FIG. 1. The camera film is vertical in the motion picture camera of FIG. 1 and a vertical arrow photographed in the scene would have the orientation shown at 340. Mirror segment 339 causes the film image 340 to form an image of the same orientation at 342 located at the scanner rotation axis 330. An incident light beam 343 which rotates with the aforementioned scanning optics, is shown incident on the film frame at point A and again at mirror segment 339 at point B from which the light ray goes through the center of projection lens 331, image rotator 332 and reflecting from mirror 333 passes through spreader lens 334 from which it intersects rotation axis 330 at point C to travel to screen 344 and arrive at image point $A_i$. The screen image "vertical arrow" 345 is shown properly oriented at 90° to the film image A. The scan direction of the scanner optics is shown as clockwise but could just as well be counterclockwise without changing the appearance of the screen image. Scan circle 335 is in a horizontal plane and the axis of rotation 330 is vertical.

FIG. 14B is a simplified plan view of the image reproducer embodiment shown in FIG. 14A. For clarity in FIG. 14A, the scanning focal plane shutter 346 (depicted in FIG. 14B and FIG. 14C) is not shown. In practice in the development of my prototype image reproducer I have found that the focal plane scanning shutter 346 is not a necessity in showing a presentable stereoscopic picture primarily because of the rapid transition between adjacent film frame scans. Elimination of scanning shutter 346 has the effect of doubling the projected image 345 light intensity on the screen 344. The film 336 is shown moving in the direction indicated by arrows in FIG. 14B. Film 336 is driven around film guide 337 by sprocket 347. The film is held against the sprocket 347 by sprocket shoes 348 and 349. A vertical section A—A is taken through the viewing screen 344 and this section is shown in the side elevation drawing FIG. 14C.

In FIG. 14C, scanning projection light 343 is incident on the film 336 at film frame 341 making an angle of incidence of $\beta$ with respect to a horizontal plane. The angle $\beta$ in practice is found to be 10° maximum before any observable projected screen image degradation occurs. Ideally the angle $\beta$ would be zero but to avoid beam splitting and attendant light loss in acquiring the image 360 of film frame 341 in mirror segment 339 for projection, the angle $\beta$ was resorted to with acceptable results as my invention model has proven.

FIG. 15 shows a simplified perspective of selective viewing of vertical segments of screen images at different points in time. The optically scanned pseudo slit is shown along scan circle 335 at D and B as the scan moves in a clockwise direction. Screen 344 returns all of the incident light generated from the psuedo projector node at position D at time T to vertical pseudo slit DC. The eye 370 is located in a vertical plane which also contains DC and mn. The vertical line mn is contained within the projected image 371. The image 371 can be seen in its entirety when the eye 370 moves up to the pseudo slit 372 and when the eye is at any location along line DC. Likewise, the eye 370 can be anywhere in the extended plane described by mn CD as it extends out away from scan circle 335. If eye 370 moves laterally right or left from the aforementioned plane containing mn, various other vertical slices of screen image 371 will be seen. However an eye 373 is situated such that it cannot see any of image 371 as no light is available from pseudo slit 372. When the pseudo projection point B is reached along scan circle 335 and at time T + $\Delta t$, eye 373 can look throug pseudo slit BA and see vertical slice pq of image 374 on screen 344. Vertical line pq and pseudo slit 375 and eye 373 are drawn in a single plane. Eye 370 cannot see any of image 374 at time T + $\Delta t$. As eye 373 moves laterally left or right from the vertical plane containing image line pq on image 374 various other vertical slices of screen image 374 will be seen. This then represents the mechanics of viewing dynamic images through dynamic psuedo slits as the picture images are successively scanned from the film 336 of FIGS. 14A, B and C.

FIGS. 16A, 16B and 16C show three orthographic views (side elevation, plan and end) of the means employed to rotate the film frame 341 by 90° according to an embodiment of my invention. A ninety degree rotation is required to allow the use of a standard format motion picture camera photographing pictures in accord with FIGS. 1, 2 and 3 so that horizontally moving and scanned film in my stereoscopic image reproducer can be used and that the reproduction of stereoscopic images might be compatible with scenes photographed in nature.

In FIG. 16A, scanner 407 spinning about axis 330 above the flicker rate, contains light source 400 and light condenser system made up of lens 401, mirror 402 and lens 403. Light emerging from 403 reflects from stationary conical mirror 404 at point P. As scanner 407 rotates, light reflects sequentially from an infinite number of points along a circle contained in 404 and passing through point P having a center at the axis of rotation 330 as shown in FIG. 16B. Reflected light from 404 passes through the film of which a single frame 341 is shown. The light continues through focal plane shutter 346 which has an opening cut equal to the size of a single film frame. Experience in testing my prototype image reproducer, has shown that the focal plane shutter 346 is not required and that the projected screen illumination can be doubled with its removal. Light passing through 346 continues to a segment 339 of mirror drum 338. This causes an image of the film frame 341 to appear at the center of mirror drum 338 and on rotation axis 330. Image 360 becomes the illuminated image which is projected toward the screen by the remainder of the optics which in turn rotate this image 90°. Mirror 405 in practice is set at 5° to the vertical so that inclination light from image 360 at 10° to the horizontal will reflect in a horizontal plane. In practice, due to the five degree tilt of mirror 405, angle $\theta$ is found to be 95°.

In FIG. 16B, the distance from rotation axis 330 to Q equals the distance from 330 to R and the light reflected from mirror 405 at Q is aimed through projection lens 331 at point R on parallelogram mirror 406. Light reflecting from mirror 406 makes an angle of 45° to the horizontal plane as shown in FIG. 16C as the light proceeds to mirror 333 and to the spreader (negative lens) 334 from which the image light diverges toward the projection screen located on the other side of the rotation axis 330 and discussed with previous figures. Point 350 is the pseudo nodal projection scanning point discussed in FIGS. 14A, B and C. The combination of all of these reflections, results in the film image rotation of 90° before striking the viewing screen.

FIG. 17 shows a simplified side elevation view of an image reproduction embodiment of my invention in which the picture is made to move on the screen and appear to the viewer's eyes as multidimensional perspectives in continuous motion similar to natural scenes to the naked eye. In FIG. 17, scanner 407 is spinning about rotation axis 330 such that it scans a fixed point at a rate above the flicker frequency for the human eye. Any number of scan element sections may be employed. Scanning optical elements in FIG. 17 are defined as condenser lens 401, mirror 402, condenser lens 403, focal plane shutter 346 and mirror 405. Not shown, for simplicity of illustration, are several more scanner optical elements described in FIGS. 16A, B and C. In FIG. 17, lamp source 400 is fixed and the scanner 407 rotates around 400. Bracket 420 attaches lens 401 to scanner light box 407. Bracket 421 attaches mirror 402 to scanner light box 407. The sweeping constant illumination emitted by scanner condensing lens system, moves over cone mirror 404. The angular aperture of the cone mirror 404 as subtended at the rotation axis 330, is made 120 degrees for my invention model. The reflected light from 404 passes through a circular arc of horizontally moving film (16mm motion picture sound film was used in my invention model). Although film 336 is shown making a continuous circle about rotation axis 330 and locked to mirror drum 338 in an integral unit, film 336 can be a long length on conventional feed and take up reels or a long continuous loop. The drive sprocket is linked to mirror drum 338 to assure that mirror drum mirror segment 339 always moves at the same angular velocity as film frame 341. Mirror segment 339 and film frame 341 are arbitrary samples of similar elements in the mirror drum and film transit system that require this type of syncronization. Framing is accomplished by laterally shifting the film with respect to its assigned mirror facet. Scanner 407 is driven by motor 430 through shaft 431 and coupler flange 432. Motor 430 is attached to stationary base plate 438 which is suspended above table top or ground reference 440 by legs 439. The motor speed selected for my invention model was 1500 RPM. Since my invention model used two sets of scanning optics, the scanning rate is 50 Hz. Sleeve 433 is synchronized to film circle 336 and mirror drum 338 assembly by means of film motor 437, timing pulley 435, timing belt 436 and timing pulley 434. The rotation rate for motion pictures is taken as a standard 24 frames per second. My stereoscopic image reproducer model used 80 pictures per 360 degrees.

Figure 18B:
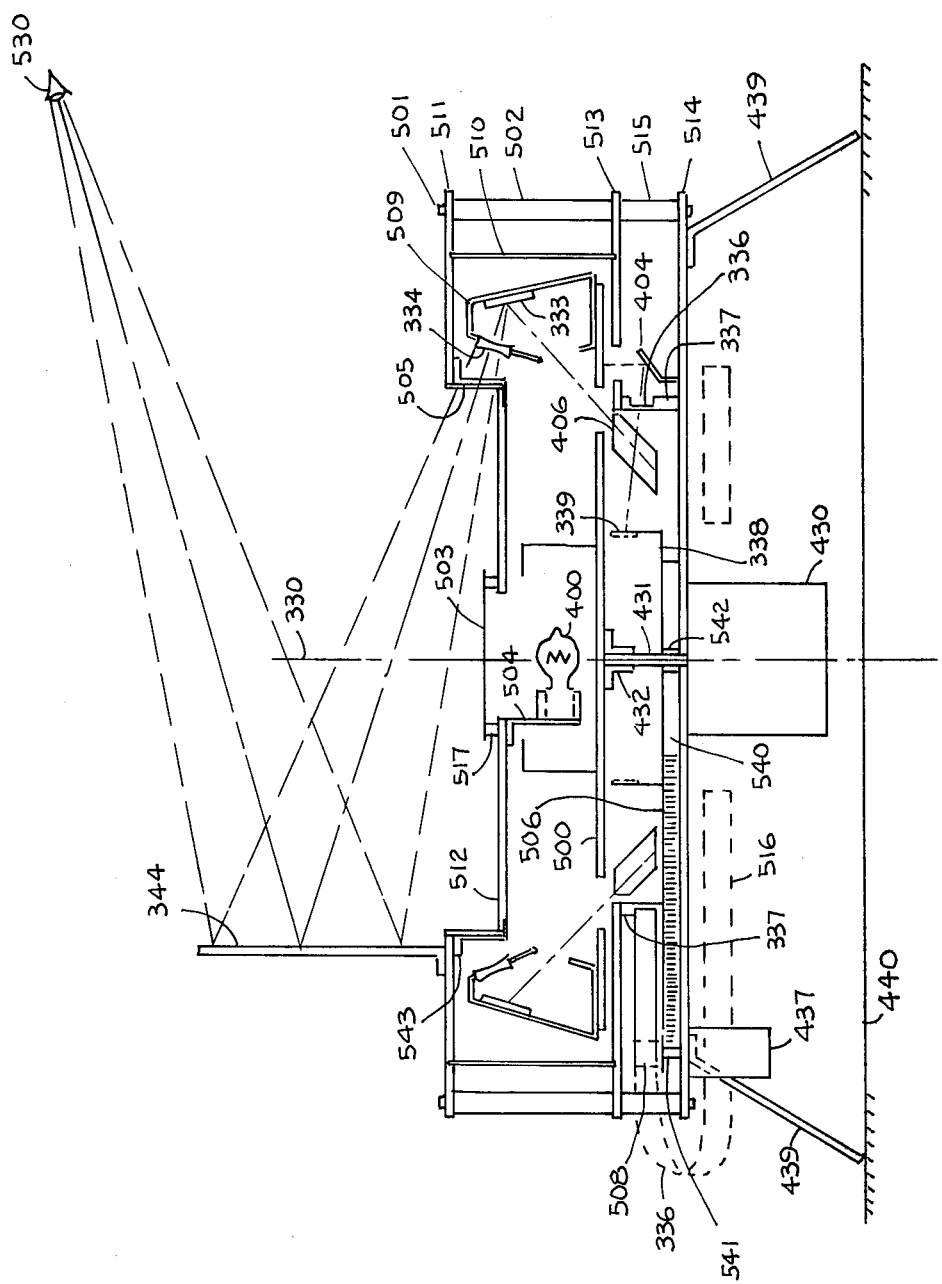
FIG. 18B shows a side elevation view through section A — A of FIG. 18A with the scanner oriented in the projection mode.
Figure 18C:
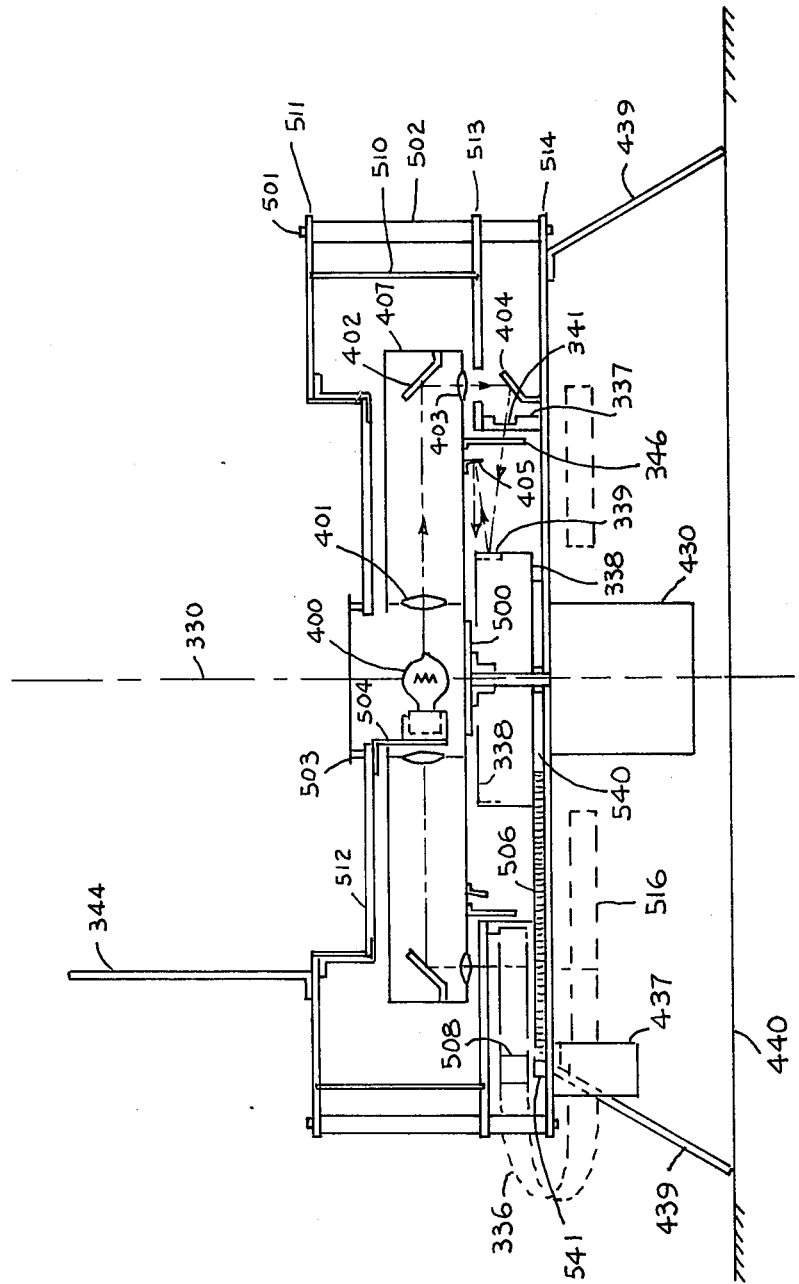
FIG. 18C shows a side elevation view through section B — B of FIG. 18A with the scanner oriented in the light generating mode.

FIGS. 18A, B and C show three views of the embodiment of the stereoscopic motion picture image reproducer according to my invention. FIG. 18A is a plan view in which two sections AA and BB are delineated. Section AA is shown in FIG. 18B and is a view of the projection optics when scanning past a normal to the screen 344. Section BB is shown in FIG. 18C and is a view of the light gathering optics as required to illuminate the film plane 341 as one representative frame. The film scan arc encompasses a 120 degree segment from $m$ to $n$ in FIG. 18A. In FIG. 18A, stationary light source 400 and scanning optics 401 and 403 are contained in light box 407. Reflector 402 is also part of scan optics in box 407 but is shown in FIG. 18C only for clarity. The scan optics both inside and outside of box 407 are dual so that one revolution of the scanner past the relatively slow moving motion picture film 336 — causes two scans of the film frame and keeps the flicker rate above human perception. My invention model uses a 50 Hz refresh rate. Box 407 also carries external optic components including focal plane shutter 346 (which may or may not be used) mirror 405 and projection lens 331. Attached to the light box 407 is the cross bar 500 which makes a 95 degree angle to the box optic's centerline denoted by section BB in FIG. 18A. A portion of the scan optics attached to cross bar 500 — are the parallelogram shaped plane mirror 406, plane mirror 333 and concaved negative lens 334 which spreads the projection angle to the screen 344 through protective plastic circular sheet 505. Mirror segment 339 on multi-facet mirror drum 338 is shown receiving the scanned image from film frame 341 at the instant of scan. The film 336 is shown wrapped around circular film guide 337. Film 336 leaves circular guide 337 at tangents and enters the film transport mechanism depicted by rollers 507 and sprocket 508. Film 336 is shown entering and exiting the sprocket assembly. The sprocket is driven by motor 437 shown in FIG. 18B and this motion is coupled to the mirror drum through timing belt 506. The mirror drum 338 and film 336 angular velocity when the film is within circular film guide 337, is made equal by the proper ratios on the timing pulleys. My invention model used 80 mirror segments on mirror drum 338 and an 8 tooth sprocket. This combination required a 10:1 gear pulley ratio between mirror drum 338 and sprocket 508.

In FIG. 18B, motor 430 turns the scanning rotor via shaft 431 and flange coupler 432. The scanning rotor elements shown in FIG. 18B are the light box 407, the cross bar 500, the parallelogram plane mirror 406 and the spreading lens optics assembly 509 made up of mirror 333 and negative picture spreading lens 334. A hole is provided in crossbar 500 and in spreading lens optics assembly 509 for the passage of projected light from the scanner into the spreading optics from which it emerges from lens 334 to pass through the plastic curved window 505 to the formation of screen image on semi-specular screen 344. Motion picture film 336 is shown wrapped around circular film guide 337. All downward protruding scan optics are contained inside of the circular film guide. The only downward protruding scan optics shown in FIG. 18B is parallelogram mirror 406. FIG. 18C additionally shows downward protruding scan optics made up of mirror 405 and focal plane shutter 346. The only remaining downward protruding element of scan optics is projection lens 331 shown in FIG. 18A. With respect to FIGS. 18B and 18C the downward protruding scan optics are shown clearing the mirror drum 338 driving timing belt 506. Film and mirror drum drive motor 437, attached to base plate 514, is connected to the 15 tooth timing pulley 541 and to the 8 tooth film sprocket. Timing pulley 541 and timing belt 506 via film and mirror drum drive motor 437, drive 150 tooth timing pulley 540. Timing pulley 540 is connected to the mirror drum 338. Timing pulley 540 and mirror drum 338 rotate about scanning motor shaft 431 on bushing 542. In FIG. 18B, the scanning optics rotor is housed in a right circular cylindrical chamber in order to prevent the escape of stray light to the observer. This chamber is made up of top ring 511, ring 513 below the scanner cross bar 500 and the outer plastic skin 510 which is constrained to follow a circular path by circular slots cut into rings 511 and 513. Rings 511, 513 and baseplate 514 are held together in three places at 120° intervals around the periphery of the image reproducer as depicted in FIG. 18A in line with legs 439. The means for constraining the rings, baseplate and plastic skin is by circular spacers 502 and 515 and the long screw 501. To close off the scanner on the top, three brackets of which 543 is an example, connect top ring 511 to ring 512. An additional cap plate 503 is provided on three standoffs of which 517 is an example. Cap plate 503 blocks the light and the open space between 503 and 512 provides an air inlet for cooling light source 400 and also is an entrance for lamp power cord. Hot air escape is via a tangential opening in skin 510 at the rear of the image reproducer behind screen 344. This natural air flow eliminates the need for an additional fan motor and fan for cooling purposes. The image reproducer acts as a centrifugal blower to provide self cooling air flow.

FIGS. 18B and 18C show a continuous loop motion picture film cartridge 516 of doughnut shape and set below baseplate 514 and concentric with scan axis 330. There are many configurations of film transit available including the standard reel to reel mechanism, the details of which are not shown here. The electrical system is not shown as it is a conventional type of motor 430 control, motor 437 control and lamp 400 control. The addition of a sound would require the conventional sound pickup and amplification equipment which is also omitted for clarity.

FIG. 18B shows an arbitrary observer's eye which may be at any desired elevation or distance from the machine or in any desired azimuth about the screen. The azimuth angle allowed for viewing is a function of the scan angle.

FIG. 18C is equivalent to FIG. 18C except that the side elevation view stems from a section BB taken in the plan view of FIG. 18A. Section BB is taken through the position where the scanning rotor is acquiring light from lamp 400 via condenser lens 401, mirror 402 and condenser lens 403. The scanning condensed light leaving condensing lens 403 passes through an open arc in ring 513 in its path to cone mirror 404. Stationary cone mirror 404 extends over a 120° arc about axis 330 in my invention model as shown pictorially in FIG. 18A between points m and n. Cone mirror 404 reflects the scanning light through the film and into the scanning image-forming optics.

Figure 19:
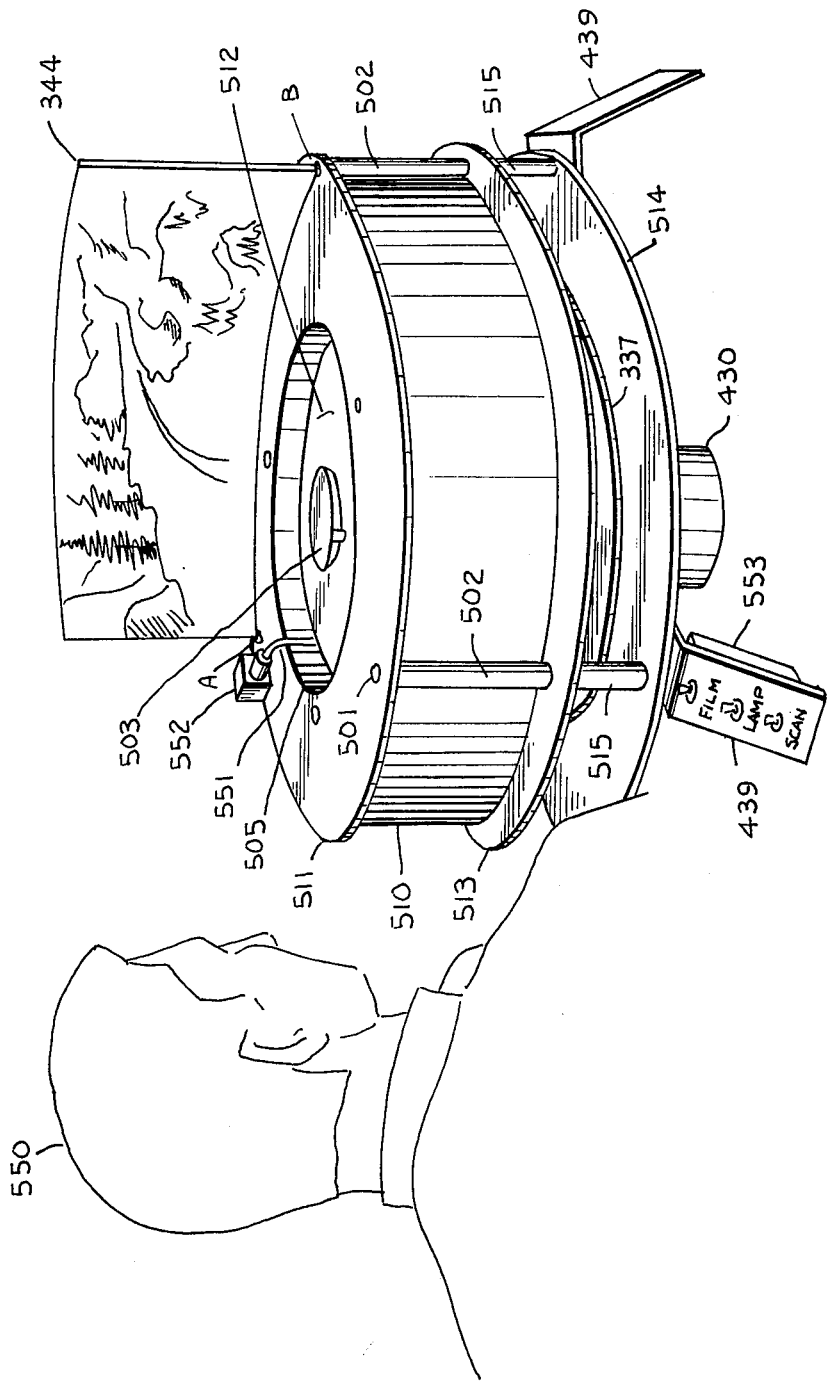
FIG. 19 shows a perspective view of an image reproducer embodiment according to my invention.

FIG. 19 shows a perspective drawing of the stereoscopic motion picture image reproducer embodiment according to my invention. Observer 550 is shown viewing a scene in depth and motion on semispecular screen 344. This screen was described in detail in FIG. 5A through FIG. 5H. This alternate screen was selected for implementation and performs very well. The inherent keystone distortion caused by the projected scanning picture coming through scan window 505 which is somewhat below the screen 344 center, is corrected by forward tilting screen 344 about pivot points A and B located slightly above top ring 511. Scan drive motor 430 is partially visible. Two of the support legs 439 are shown attached to baseplate 514. Some of the control function switches are depicted on the forward most leg 439. Part of the circular film guide 337 is shown. The remaining callouts parallel those already described in FIGS. 18A, B and C. Lamp power cord 551 is shown attached to a local receptical on ring 511 from which the cord is connected to the central control box 553. The control box 553 is shown attached to leg 439 behind the control switches. The control box 553 is a standard electrical unit.

Having thus fully described my invention and the manner in which it is to be practiced, I claim:

1. The method of recording and reproducing stereoscopic views for observation by plural observers without visual aids at the eyes of said observers, comprising:

(a). Photographing multiple sequential views of a scene from a motion picture camera in a manner such that between each sequential view relative motion takes place between the camera and scene, and the optical axis of the camera for the various views is essentially coincident or parallel with each other;

(b). Reproducing said views sequentially by projecting the views from a scanning projector onto a screen; said scanning projector being positioned, during the projection of successive views, at successive positions about the arc of a circle, with the optical axis of the projector always pointing toward the center of the circle so as to project the image to said screen on the opposite side of the center of the circle;

(c). Said screen being stationary and comprised of elementary vertical sections having horizontal corrugated ridges to vertically scatter incident light rays from said projector and so oriented that a light ray projected from said projector at one of said successive positions and passing through the center of said circle to said screen will be reflected to pass through the arc of said circle at a point which is the mirror reflection of the position of the scanning projector about a line drawn from the mid point of the scanning arc of the projector to the center of the circle, the reflected ray being substantially parallel to said line;

(d). Said screen elementary vertical sections so oriented that the picture projected from said projector at one of said successive positions may be viewed in its entirety by an eye located anywhere along a vertical line intersecting said circle at said mirror reflection of the position of said projector; and (e). The scanning of said projector being at a rate sufficient to be within the period of persistence of vision of an observer.

2. A construction for displaying motion pictures stereoptically to observers situated in front of the viewing screen of said construction, said construction including: a stationary reflective viewing screen comprised of elementary vertical sections having horizontal corrugated ridges, one or more projectors rotating about a vertical axis while projecting a sequence of pictures onto said screen, said projector optical axis directed toward said vertical axis, a multi-facet mirror drum with rotation axis coincident with said vertical axis, a motion picture film constrained to a circular film guide having axis coincident with said vertical axis, each sequential picture frame of said film separately imaged in a separate facet of said mirror drum such that all virtual images of said film frames are formed at said vertical axis, said film either stationary or slowly moving with respect to the rapid scan of said projector, said sequential picture frames rotated ninety degrees by said projector to maintain an erect picture orientation on said screen; said screen reflecting said sequential views projected by said projector to a horizontally moving vertical exit slit contained on the projection scan circle and rotating at the same angular velocity as said projector.

3. The method of recording and reproducing stereoscopic views for observation by plural observers without visual aids at the eyes of said observers, comprising:

(a). Photographing multiple sequential views of a scene from a motion picture camera in a manner such that between each sequential view relative motion takes place between the camera and scene, and the optical axis of the camera for the various views is essentially coincident or parallel with each other;

(b). Reproducing said views sequentially by projecting the views from a scanning projector onto a screen; said scanning projector being positioned, during the projection of successive views, at successive positions about the arc of a circle, with the optical axis of the projector always pointing toward the center of the circle so as to project the image to said screen on the opposite side of the center of the circle;

(c). Said screen being stationary and comprised of horizontal corrugated ridges to vertically scatter incident light rays from said projector; said screen so curved that a light ray projected from said projector at one of said successive positions and passing through the center of said circle to said screen will be reflected to pass through the arc of said circle at a point which is the mirror reflection of the position of the scanning projector about a line drawn from the mid point of the scanning arc of the projector to the center of the circle, the reflected ray being substantially parallel to said line;

(d). Said screen so curved that the picture projected from said projector at one of said successive positions may be viewed in its entirety by an eye located anywhere along a vertical line intersecting said circle at said mirror reflection of the position of said projector; and (e). The scanning rate of said projector being at a rate sufficient to be within the period of persistence of vision of an observer.

4. A construction for displaying motion pictures stereoscopically to observers situated in front of the viewing screen of said construction, said construction including: a reflective viewing screen comprised of horizontal corrugated ridges, one or more projectors rotating about a vertical axis while projecting a sequence of pictures onto said screen, said projector optical axis directed toward said vertical axis, a multifacet mirror drum with rotation axis coincident with said vertical axis, a motion picture film constrained to a circular film guide, having axis coincident with said vertical axis, each sequential picture frame of said film separately imaged in a separate facet of said mirror drum such that all virtual images of said film frames are formed at said vertical axis, said film either stationary or slowly moving with respect to the rapid scan of said projector, said sequential picture frames rotated ninety degrees by said projector to maintain an erect picture orientation on said screen; said screen reflecting said sequential views projected by said projector to a horizontally moving vertical exit slit contained on the projector scan circle and rotating at the same angular velocity as said projector.

* * * * *